(12) United States Patent
Stochino

(10) Patent No.: US 11,340,346 B1
(45) Date of Patent: May 24, 2022

(54) CENTRALIZED OBJECT DETECTION SENSOR NETWORK SYSTEM

(71) Applicant: Perceptive Inc., Redwood City, CA (US)

(72) Inventor: Alberto Stochino, Menlo Park, CA (US)

(73) Assignee: Perceptive Inc., Redwood City, CA (US)

( * ) Notice: Subject to any disclaimer, the term of this patent is extended or adjusted under 35 U.S.C. 154(b) by 0 days.

(21) Appl. No.: 17/171,850

(22) Filed: Feb. 9, 2021

Related U.S. Application Data

(60) Provisional application No. 62/972,253, filed on Feb. 10, 2020.

(51) Int. Cl.
| | |
|---|---|
| *G01S 13/87* | (2006.01) |
| *G01S 13/86* | (2006.01) |
| *G01S 7/00* | (2006.01) |
| *G01S 13/74* | (2006.01) |
| *G01S 13/34* | (2006.01) |

(52) U.S. Cl.
CPC ............ *G01S 13/878* (2013.01); *G01S 7/003* (2013.01); *G01S 13/34* (2013.01); *G01S 13/74* (2013.01); *G01S 13/86* (2013.01); *G01S 13/87* (2013.01)

(58) Field of Classification Search
CPC ...... G01S 13/931; G01S 7/003; G01S 7/4078; G01S 13/86; G01S 1/02; G01S 13/74; G01S 2013/9316; G01S 13/865; G01S 2013/9329; G01S 13/003; G01S 13/876; G01S 13/767; G01S 13/56; G01S 13/878; G01S 13/34; G01S 13/87; G01S 7/527; G01S 15/08; G01S 7/4817; G01S 15/04; G01S 7/292; G01S 7/4004; G01S 7/526; G01S 7/415; H04W 84/18; H04W 88/08; H04W 4/38; H04W 40/22; H04B 7/14; H04B 7/15; H04B 7/155

See application file for complete search history.

(56) References Cited

U.S. PATENT DOCUMENTS

| | | |
|---|---|---|
| 9,557,414 B1 * | 1/2017 | Morgan ................ G01S 13/767 |
| 10,247,819 B2 | 4/2019 | Aoyagi et al. |

(Continued)

FOREIGN PATENT DOCUMENTS

| | | |
|---|---|---|
| CN | 110412559 A | 11/2019 |
| DE | 10-2013-007001 A1 | 10/2014 |

(Continued)

OTHER PUBLICATIONS

International Search Report for PCT/US21/17100 dated Nov. 16, 2021, pp. 3-4.

*Primary Examiner* — Olumide Ajibade Akonai
(74) *Attorney, Agent, or Firm* — Knobbe Martens Olson & Bear LLP

(57) ABSTRACT

A centralized object detection sensor network system comprises a central unit configured to generate one or more probing signals for detecting one or more objects in an environment, and one or more transponders configured to receive the one or more probing signals and convert them into free space waves for detecting the one or more objects in the environment. The one or more transponders are communicatively coupled to the central unit through one or more communication links.

30 Claims, 12 Drawing Sheets

(56) References Cited

U.S. PATENT DOCUMENTS

| | | | | |
|---|---|---|---|---|
| 2007/0063833 | A1* | 3/2007 | Kates | G08B 25/009 340/521 |
| 2007/0229237 | A1* | 10/2007 | Kates | G08B 25/10 340/426.25 |
| 2009/0153336 | A1* | 6/2009 | Kates | G08B 25/009 340/602 |
| 2013/0265189 | A1* | 10/2013 | Chang | G01S 13/87 342/52 |
| 2015/0061877 | A1* | 3/2015 | Kates | G08B 17/10 340/628 |
| 2016/0116441 | A1* | 4/2016 | Fukuman | G01S 15/931 73/597 |
| 2017/0290011 | A1 | 10/2017 | Kushnir et al. | |
| 2017/0299720 | A1* | 10/2017 | Matsuura | G01S 7/536 |
| 2017/0307751 | A1* | 10/2017 | Rohani | G01S 17/89 |
| 2018/0307220 | A1* | 10/2018 | Hammerschmidt | G05B 23/0213 |
| 2019/0329761 | A1* | 10/2019 | Kim | B62D 15/0285 |
| 2020/0305096 | A1 | 9/2020 | Brighenti et al. | |
| 2021/0020037 | A1* | 1/2021 | Awad Alla | G08G 1/052 |
| 2021/0109564 | A1* | 4/2021 | Hirotsu | G06F 1/12 |

FOREIGN PATENT DOCUMENTS

| | | | | |
|---|---|---|---|---|
| EP | 2081048 A1 | * | 7/2009 | ......... H04B 7/15514 |
| EP | 3319172 B1 | | 10/2020 | |
| KR | 10-2018-0044257 A | | 5/2018 | |
| WO | WO 2020/006531 A1 | | 1/2020 | |
| WO | WO 2020/252743 A1 | | 12/2020 | |

\* cited by examiner

CENTRALIZED OBJECT DETECTION SENSOR NETWORK SYSTEM

CROSS-REFERENCE TO RELATED APPLICATIONS

This application claims the benefit of priority to U.S. Provisional Patent Application No. 62/972,253, filed Feb. 10, 2020, entitled "CENTRALIZED OBJECT DETECTION SENSOR NETWORK SYSTEM," the content of which is hereby incorporated by reference herein in its entirety.

INCORPORATION BY REFERENCE

This application incorporates by reference the entirety of each of the following patent applications: U.S. patent application Ser. No. 16/599,822, filed on Oct. 11, 2019, entitled "PERCEPTION SYSTEMS FOR USE IN AUTONOMOUSLY CONTROLLING SYSTEMS," now U.S. Pat. No. 10,754,011, which is a continuation-in-part of U.S. patent application Ser. No. 16/298,752, filed Mar. 11, 2019, entitled "PERCEPTION SYSTEMS FOR USE IN AUTONOMOUSLY CONTROLLING SYSTEMS," now U.S. Pat. No. 10,754,011, which claims priority benefit under 35 U.S.C. § 119(e) to U.S. Provisional Patent Application No. 62/692,417, filed Jun. 29, 2018, entitled "PERCEPTION SYSTEMS FOR USE IN AUTONOMOUSLY CONTROLLING SYSTEMS"; U.S. patent application Ser. No. 16/427,215, filed on May 30, 2019, entitled "SYSTEMS AND METHODS FOR MEASURING CHARACTERISTICS OF AN OBJECT AT DISTANCE," which claims priority benefit under 35 U.S.C. § 119(e) to U.S. Provisional Patent Application No. 62/692,417, filed Jun. 29, 2018, entitled "PERCEPTION SYSTEMS FOR USE IN AUTONOMOUSLY CONTROLLING SYSTEMS," and to U.S. Provisional Patent Application No. 62/850,933, filed May 21, 2019, entitled "SYSTEMS AND METHODS FOR MEASURING CHARACTERISTICS OF AN OBJECT AT DISTANCE."

To the extent that they are not incompatible, various embodiments disclosed herein may be combined with various embodiments of perception systems described in each of the above applications.

BACKGROUND

Field

The disclosed technology generally relates to sensor network systems for sensing objects in an environment, and more particularly to object detection sensor network systems that are adapted for long baseline applications.

Description of the Related Art

Various sensors may be employed for detecting objects and measuring their velocities and locations. For example, radio detection and ranging (RADAR) and light detection and ranging (LIDAR) may be employed to detect objects and determine their range and/or velocity (speed and direction of motion). While the goals may be similar, RADAR uses radio waves while LIDAR uses light waves to measure the velocity and location of an object with respect to a reference frame.

SUMMARY

In one aspect, centralized object detection sensor network system for detecting one or more objects in an environment comprises a central unit coupled to one or more transponders through one or more communication links. The one or more transponders are physically separate from the central unit while being communicatively coupled thereto through the one or more communication links. The central unit is configured to generate one or more baseband signals, use them to generate one or more probing signals and transmit the one or more probing signals to one or more transponders through the one or more communication links. The central unit is further configured to receive one or more echo signals from the one or more transponders through the one or more communication links, and detect the one or more objects based at least in part on the one or more echo signals and the one or more baseband signals. The transponders are configured to receive the probing signals from the central unit through the communication links, generate free space probing waves and direct the free space probing waves to the environment for detecting the one or more objects. The transponders are further configured to receive one or more free space echo waves from the one or more objects, generate the one or more echo signals using the free space echo waves and transmit the one or more echo signals to the central unit through the one or more communication links.

In another aspect, a centralized object detection sensor network system for detecting one or more objects in an environment comprises a central unit communicatively coupled to one or more transponders through one or more communication links, where the transponders are physically separate from the central unit. The central unit is configured to generate one or more multiplexed probing signals and transmit at least one of the multiplexed probing signals to one of the transponders through one of the communication links and receive a multiplexed echo signal from the one of the transponders through the one of the communication links. The central unit is further configured to detect the one or more objects, based at least in part on one or more reflected baseband signals, wherein the one or more reflected baseband signals are generated using the one of the multiplexed echo signals. The one of the transponders is configured to receive the one of the multiplexed probing signals from the central unit through the one of the communication links, generate one or more radio frequency (RF) probing signals using the one of the multiplexed probing signals and one or more RF carrier signals. Next, the one of the transponders converts the one or more RF probing signals into free space probing waves and directs the free space probing waves to the environment for detecting the one or more objects. The one of the transponders is further configured to receive one or more free space echo waves from the one or more objects, and generate the multiplexed echo signal using the free space echo waves and transmit the multiplexed echo signal to the central unit through the communication link.

In a third aspect, a centralized object detection sensor network system for detecting one or more objects in an environment comprises a central unit communicatively coupled to one or more lidar-radar transponders through one or more communication links. The one or more lidar-radar transponders are physically separate from the central unit. The central unit is configured to: generate one or more radar probing signals and one or more lidar probing signals; transmit the one or more radar probing signals and the one or more lidar probing signals to the one or more lidar-radar transponders; receive one or more radar echo signals and one or more lidar echo signals from the one or more lidar-radar transponders; and detect the one or more objects based at least in part on the one or more radar echo signals and the one or more lidar echo signals.

DETAILED DESCRIPTION

Figure 1A:
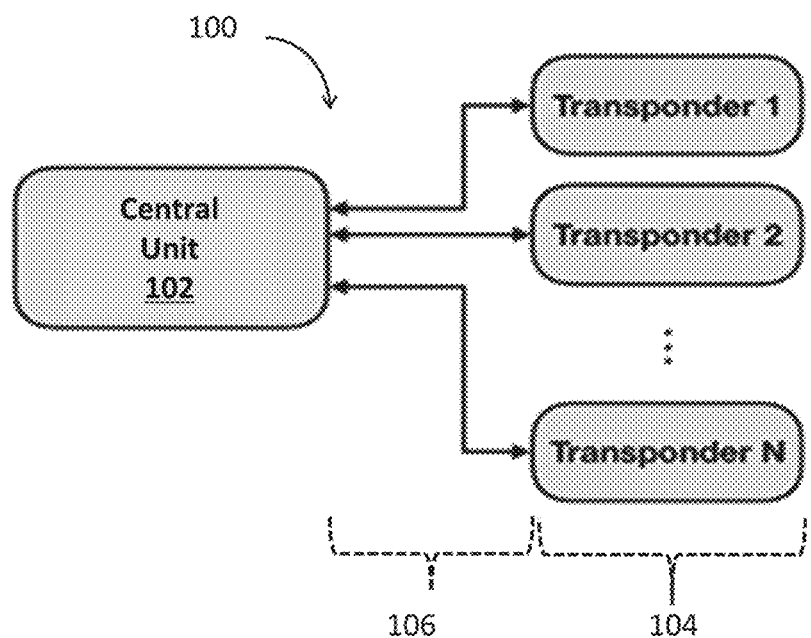
FIG. 1A illustrates a centralized object detection sensor network system having a central unit coupled to a plurality of transponders through communication links, according to embodiments.

Disclosed herein are centralized object detection sensor network systems adapted for long-baseline sensing, e.g., radar and/or lidar sensor networks, that support extended spatial and/or angular coverage. Possible applications for the disclosed systems include, but are not limited to, autonomous vehicles (e.g. ground-, air-, or sea-based), extended indoor spaces, and outdoor areas.

To address these and other needs, disclosed herein is a centralized object detection sensor network system comprising a central unit configured to generate one or more probing signals for detecting one or more objects in an environment, and one or more transponders configured to receive the one or more probing signals and convert them into free space waves for detecting the one or more objects in the environment.

Radio detection and ranging (RADAR) and light detection and ranging (LIDAR) are well-known sensing modalities for detecting objects and determine their range and/or velocity (speed and direction of motion) in an environment. Radar can be used to detect objects in a larger area and low visibility weather conditions compared to LIDAR; however, LIDAR provides higher resolution and accuracy. A detection and ranging system may use one or more RADARS and/or one or more LIDARS to facilitate detection of one or more objects distributed in an environment. The signal processing functions and components employed for generation of a probing signal (e.g., used to generate radio waves or light waves) and processing the corresponding echo signal (e.g., generated by reflection of the radio waves or the light waves), to determine the location and/or velocity of an object, may involve complex, and high-power consumption digital and analog signal processing units. In many applications, object detection systems may employ multiple sensors located in different positions to detect objects (e.g., to improve the accuracy, to cover larger areas, cover different directions and the like). As such, there is a need for methods and systems that enable reducing the number, the complexity, and the electrical power demands of signal processing units employed for detection and range finding based on multiple sensors. For example, if multiple sensors are connected to a central processing unit where all complex signal processing steps associated with extracting information about the detected objects (e.g., position, velocity and the like) are performed, the size, cost, power consumption and complexity of the sensors may be reduced. Such a centralized approach may allow using more sensors and distributing in a larger area. A centralized sensor system may also benefit from making the original ("raw") information contained in multiple echo signals received by the central processing unit and exploit them through the more advanced signal processing chains that can be implemented in the central processing unit. It should be appreciated that if the received echo signals are processed within each sensor, the level and accuracy of the information extracted from the echo signals may be limited by the computational resources available within each sensor resulting in an inefficient usage of the raw information encoded in the echo signal.

Additionally, if centralized sensor systems and methods can support both RADAR and LIDAR sensors to enable detection based on both radio waves and light waves, they may enable the realization of compact multi-emitter detection systems that combine high-resolution directional detection with and long-range wide area detection and low-visibility resilience.

FIG. 1A illustrates a centralized object detection sensor network system 100, according to various embodiments. The centralized object detection sensor network system 100 may include a central signal generation and processing unit 102, also referred to herein as a central unit, one or more transponders 104 and one or more communication links 106, also referred to herein as links, that communicatively connect the one or more transponders 104 to the central unit 102. The one or more links 106 can be bidirectional analog or digital communication links. Further, the one or more links 106 may include one or more of optical communication links, RF communication links, Ethernet communication links or other types of digital or analog communication links. In some cases, a subset of the links may be RF communication links or optical links or Ethernet links. In some embodiments, the one or more links 106 may comprise multiple-input and multiple-output (MIMO) RF or optical links.

Figure 1B:
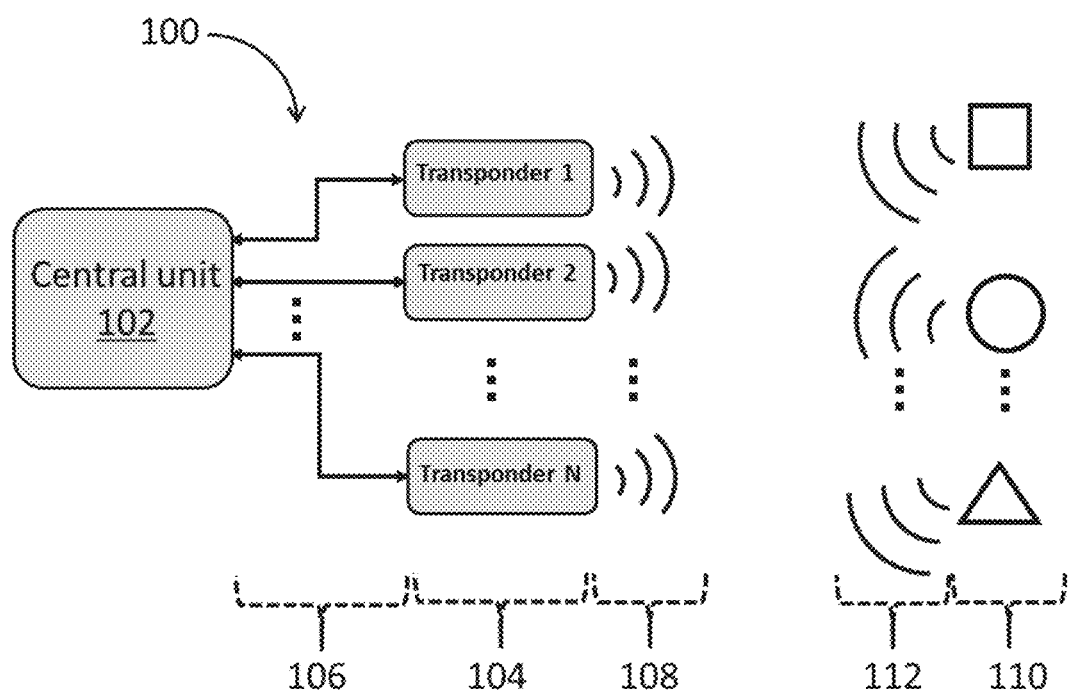
FIG. 1B illustrates a centralized object detection sensor network system (e.g., the system shown in FIG. 1A), which is configured to emit multiple waves and use multiple echo waves reflected by one or more objects to determine velocities and/or locations of the one or more objects in an environment, according to embodiments.

FIG. 1B illustrates some details associated with object detection using the centralized object detection sensor network system 100. In various embodiments, the central unit 102 generates one or more probing signals configured for detecting objects in an environment and transmits the one or more probing signals to the one or more transponders 104 via the one or more links 106. The one or more transponders 104 convert the one or more probing signals to one or more free space probing waves 108 and direct them to the environment. The one or more free space probing waves can be free space radio waves or free space optical waves. In some embodiments, for example where radio waves are used for object detection, to generate the one or more free space probing waves, the one or more transponders 104 first convert (e.g., upconvert) the one or more probing signals (e.g., baseband or intermediate frequency probing signals) to one or more RF probing signals. The one or more transponders 104 may use the one or more RF probing signals to generate the one or more free space probing waves 108 (e.g., radio waves). The environment may include one or more objects 110 that generate one or more free space echo waves 112 by reflecting a portion of the one or more free space probing waves 108. The transponders 104 may receive portions of the free space echo waves 112, convert the received portions of the free space echo waves 112 to one or more echo signals and transmit the one or more echo signals back to the central unit 102 via the one or more links 106. In some embodiments, for example where the echo signals are generated using radio waves, the one or more transponders 104 convert one or more free space echo waves (e.g., received via one or more antennas), to one or more RF echo signals. Subsequently, the one or more transponders 104 may use the one or more RF echo signals to generate the one or more echo signals. The central unit 102 receives and processes the one or more echo signals to determine positions and velocities of the one or more objects 110.

In the illustrated embodiments in FIGS. 1A and 1B, the central unit 102, is advantageously physically separated from the one or more transponders 104 for physical separation between the computational and sensing functionalities of the sensor network system 100, which provides various advantages described above. For example, the central unit 102 advantageously serves as a common central processing unit to compute and determine the positions and velocities of the one or more objects 110 detected by the one or more transponders 104. In these embodiments, the one or more transponders 104 are not configured to provide computing functions for the determination of the positions and velocities of the one or more objects 110. By arranging the central unit 102 to serve as a common central processing unit for the one or more transponders 104, cost, reliability and complexity of the sensor network 100 may advantageously be reduced.

In some embodiments, the probing signals can be continuous wave (CW) signals (e.g., signals that continuously vary in time domain without any sudden change of amplitude in time). CW probing signals may be used to generate CW free space probing waves and therefore CW echo waves and echo signals. In some other embodiments, the probing signals can be pulsed signals (e.g., signals that include sudden changes of amplitude in time domain). Pulsed probing signals may be used to generate pulsed free space probing waves and therefore pulsed echo waves and echo signals. Advantageously, centralized object detection sensor network systems that use CW probing signals CW detection techniques, may be able to measure the positon and velocities of objects with higher precision compared to pulsed systems. In some embodiments, the centralized object detection sensor network systems described herein may use CW probing signals and CW position and velocity measurement techniques to detect objects in an environment.

In some embodiments, two or more probing signals may be multiplexed to form one or more multiplexed probing signals and two or more echo signals may be multiplexed to form one or more multiplexed echo signals. The echo signals or the probing signals can be multiplexed using various multiplexing techniques such as wavelength (or frequency) division multiplexing, time division multiplexing, polarization division multiplexing, angular momentum division multiplexing, code division multiplexing or other multiplexing methods used for multiplexing signals in optical domain, electrical domain or RF domain. Advantageously, multiplexing probing and echo signals may reduce a number of links required to connect the one or more transponders 104 to the central unit 102 without reducing the number of probing signals (and the corresponding echo signals) communicated with each transponder.

In various embodiments, the probing signals and the echo signals may comprise: one more of analog signals (e.g., electronic analog signals), digital signals (electronic digital signals), Ethernet signals, analog optical signals or digital optical signals.

In various embodiments, the probing signals (e.g., electronic signals) may be baseband signals, intermediate frequency (IF) signals, or radio frequency (RF) signals. An IF signal can be an intermediate frequency (IF) carrier whose amplitude or phase is modulated by one or more baseband signals. An RF signal can be a radio frequency (RF) carrier whose amplitude or phase is modulated by one or more baseband signals or one or more IF signals. In various embodiments, the echo signals may be reflected baseband signals, or reflected baseband signals carried by one or more IF or RF carrier signals. For example, phases or amplitudes of the one or more RF or IF carrier signals may be modulated by the reflected baseband signals. In some examples, phases or amplitudes of the one or more RF carrier signals may be modulated an IF signals that carry the reflected baseband signals. RF carrier signals can be single tone harmonic signals generated by an oscillator (e.g., a local oscillator) and having frequencies between 1-5 GHz, 5-10 GHz, 10-20 GHz, 20-30 GHz, 30-40 GHz, 40-50 GHz, 50-60 GHz, 60-70 GHz, 70-80 GHz, 80-90 GHz, 90-100 GHz, 100 GHz-200 GHz, 200-300 GHz. IF carrier signals can be single tone harmonic signals generated by an oscillator (e.g., a local oscillator) and having frequencies between 10 MHz to 10 GHz.

In various embodiments, probing signals and echo signals can be optical signals (referred to as optical probing signals and optical echo signals). Optical signals can be digital optical signals or analog optical signals.

Analog optical signals may comprise one or more optical carrier signals whose amplitude, phase, polarization or angular momentum modulated with one or more baseband signals, IF signals or RF signals. Digital optical signals may comprise one or more optical carrier signals whose amplitude, phase, polarization or angular momentum are modulated with one or more digital baseband signals. An optical carrier can be a single tone harmonic light wave (e.g., a laser light) having a frequency (or wavelength) in the visible, near-infrared, or mid-infrared range. In some examples, the frequency of the optical carrier can be between 100 THz to 850 THz (corresponding to a wavelength between 352 nm to 2997 nm).

In some examples, the probing signals may be radar signals. In some examples, some of the radar signals may comprise an RF carrier whose amplitude or phase is modulated by one or more baseband signals. In some other examples, at least some of the probing signals may comprise baseband signals. In yet other examples, at least some of the radar signals may comprise an RF carrier whose frequency is shifted by an intermediate frequency (IF) signal whose phase or amplitude is modulated by one or more baseband signals. Each baseband signal may be a digital signal or an analog signal. The frequency of the RF signal may range from few to few hundred gigahertz (e.g., between 1-5 GHz, 5-10 GHz, 10-20 GHz, 20-30 GHz, 30-40 GHz, 40-50 GHz, 50-60 GHz, 60-70 GHz, 70-80 GHz, 80-90 GHz, 90-100 GHz, 100 GHz-200 GHz, 200-300 GHz). The frequency of the baseband signal may range from 1 MHz to 10 GHz and the frequency of the IF signal may range from 10 MHz to few 10 GHz.

In various embodiments, a probing signal can be a digital electronic signal or a digital optical signal. A digital electronic signal can be a digitized baseband signal, a digitized IF signal or a digitized RF signal. A digital optical signal can be an optical carrier signal modulated by a digital electronic signal.

In various embodiments, an electronic-to-optical (E/O) converter electronic signal may convert an electronic signal to an optical signal by directly modulating an amplitude or a phase of a laser. Alternatively, an electronic-to-optical (E/O) convert can convert an electronic signal to an optical signal by externally modulating an amplitude or a phase of a laser using an optical amplitude or phase modulator.

In some embodiments, the probing signals and echo signals associated with a transponder may be communicated with the central unit 102, via a single bidirectional link (e.g., using one or more routers in the central unit and in the transponder). In some other embodiments, two separate links may be used for sending probing signals from the central unit 102 to a transponder and sending echo signals from the transponder to the central unit 102.

Still referring to FIGS. 1A and 1B, the central unit 102 may comprise several subsystems including but not limited to: a signal processing unit (e.g., a digital signal processing unit), a transmitter unit, a receiver unit, and a router unit. The receiver unit may include one or more receivers and the transmitter unit may include one or more transmitters. The signal processing unit may generate one or more baseband signals and the transmitter unit may convert the one or more baseband signals to one or more probing signals (e.g., by digital-to-analog conversion, up-conversion to higher RF frequencies, and/or amplification). The receiver unit may receive one or more echo signals corresponding to the one or more probing signals and provide one or more reflected baseband signals to the signal processing unit. The signal processing unit may process the one or more reflected baseband signals to determine positions and or velocities of one or more objects in the environment. Processing the one or more reflected baseband signals may include a comparison between the one or more baseband signals and the one or more reflected baseband signals. In various embodiments, the baseband signals and the reflected baseband signals can be analog or digital electronic signals.

In some embodiments, the probing signals, multiplexed probing signals, echo signals and multiplexed echo signals can be optical signals. In such embodiments, the central unit may include one or more electrical-to-optical converters and one or more optical-to-electrical converters. In some examples, the one or more electrical-to-optical converters may include one or more lasers to convert electronic probing signals to optical probing signals. In some cases, the one or more lasers may be directly modulated while in other cases one or more optical modulators may be used to modulate optical outputs of the one or more lasers. In some examples, one or more optical-to-electrical converters may include one or more photodetectors configured to convert optical echo signals to electronic echo signals.

Still referring to FIGS. 1A and 1B, in some embodiments, the central unit 102 may include a multiplexing unit and a demultiplexing unit. The multiplexing unit may include one or more optical and/or electronic multiplexers configured to multiplex two or more probing signals to generate one or multiplexed probing signals. The demultiplexing unit may include one or more optical or electronic demultiplexers configured to generate two or more echo signals by demultiplexing one or more multiplexed echo signal.

The router unit may be configured to couple probing signals from the transmitter unit or the multiplexing unit to the one or more links 106 that communicatively connect the central unit 102 to one or more transponders 104 and couple the echo signals received via the one or more links 106 to the receiver unit. Advantageously, the router unit allows using a single link to send a probing signal or a multiplexed probing signal and simultaneously receive an echo signal or a multiplexed echo signal.

In some embodiments, each transmitter unit may include one or more digital to analog (D-to-A) converters to convert digital input baseband signals generated by signal processing module to analog input baseband signals. In some embodiments, each receiver may include one or more analog to digital (A-to-D) converters to convert analog output baseband signals to digital output baseband signals. In some embodiments, each transmitter may include components configured to mix RF carrier signals with baseband signals (up-conversion) and each receiver may include components configured to extract baseband signals from modulated RF carrier signals.

The signal processing unit may comprise a digital signal processing module configured to receive and process digital signals (e.g., digital output baseband signals) to provide information pertaining to positions and/or velocities of one or more objects in the environment. The digital signal processing unit may comprise a memory configured to store digital data and machine-readable instructions, a processor configured to process the digital data or one or more digital signals and generate an output signal by executing the machine-readable instructions, and an output interface configured to output the one or more output signals.

In some embodiments, the signal processing unit may include one or more digital to analog (D-to-A) converters to convert digital input baseband signals generated by the digital signal processing module to analog input baseband signals and one or more analog to digital (A-to-D) converters to convert analog output baseband signals generated by the one or more receivers to digital output baseband signals.

A transponder of the one or more transponders 104 may comprise several components, subsystems or units including but not limited to an antenna unit. The antenna unit may comprise one or more antennas configured to convert one or more probing signals to one or more free space probing waves and convert one or more free space echo waves, associated with the free space probing waves, to one or more echo signals. In some cases, the antennas of the antenna unit may be configured as multiple input multiple output (MIMO) antennas.

Each antenna used in a transponder can be an RF antenna configured to convert RF signals (e.g., RF probing signals) to free space radio waves or an optical antenna configured to convert optical signals (e.g., guided optical waves) to free space light waves.

In some embodiments, one or more of the transponders 104 may include one or more phased array antennas each capable of directing the free space waves (radio wave or light waves) to a propagation direction. Each of the one or more phased array antennas may include a plurality of antennas and the propagation direction may be determined by a phase relation among the free space waves emitted by the plurality of antennas. In some cases, the phase relation and therefore the propagation direction may be determined by one or more probing signals received by the transponder. The one or more phased array antennas can be optical phased array antennas configured to control the propagation direction of light waves or RF phased array antennas configured to control the propagation direction of radio waves.

In some embodiments, one or more of the transponders 104 may include components for mixing RF carrier signals with baseband signals (up-conversion) and/or extracting basebands signals from modulated RF carrier signals. In some embodiments, the transponder may include subsystems for demultiplexing one or more probing signals from a multiplexed probing signal received from the central unit and generating a multiplexed echo signal comprising one or more echo signals.

In some cases, the probing signals, multiplexed probing signals, echo signals and multiplexed echo signals can be optical signals. In such embodiments, the transponder may include one or more components for electrical-to-optical and optical-to-electrical conversion. For example, the transponder may include one or more photodetectors to convert optical probing signals to electronic probing signals, and one or more lasers to convert electronic echo signals to optical echo signals. In some cases, the one or more lasers may be directly modulated while in other cases one or more optical modulators may be used to modulate optical outputs of the one or more lasers.

Still referring to FIGS. 1A and 1B, in some embodiments, one or more links 106 may comprise one or more coaxial cables configured for transmitting RF probing signals (e.g., multiplexed RF probing signals) and RF echo signals (multiplexed RF echo signals), or one or more optical fibers for transmitting optical probing signals (e.g., multiplexed optical probing signals) and optical echo signals (e.g., multiplexed optical echo signals). In some cases, one or more coaxial waveguides may be bundled as a single cable. In some cases, the one or more optical fibers may be bundled as a single cable. In some cases, some of the one or more optical fibers can be single mode optical fibers, multi-mode optical fibers or multicore optical fibers. In some cases, some of the one or more optical fibers can be polarization maintaining optical fibers or other types of specialized optical fibers (e.g., having a special cross-sectional profile, special material composition, special dispersive properties, and the like). In some embodiments, the one or more links 106 may comprise a multiple input-multiple output (MIMO) link between the central unit and the one or more transponders.

Figure 2A:
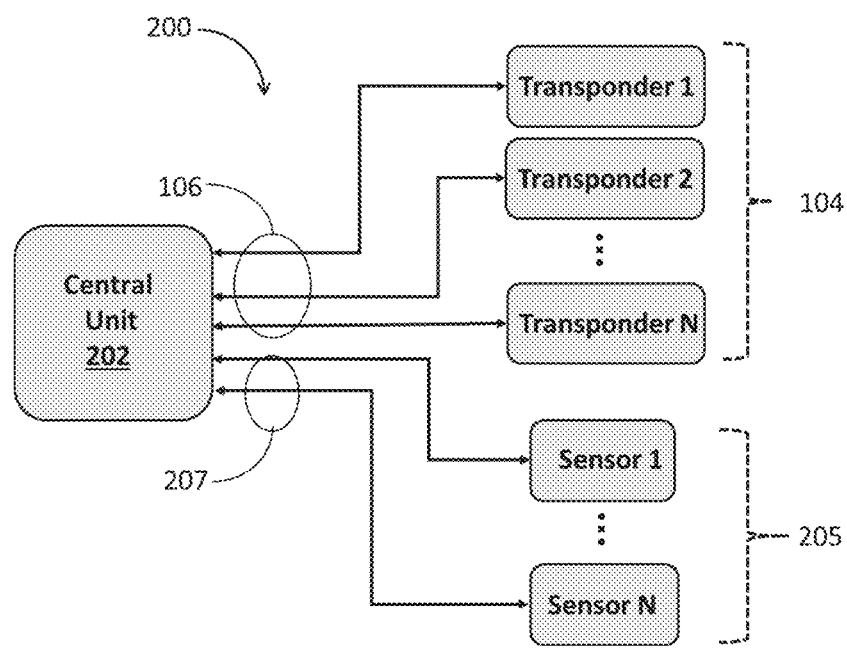
FIG. 2A illustrates a hybrid centralized object detection sensor network system having a central unit coupled to a plurality of transponders and a plurality of other sensors through a plurality of communication links, according to embodiments.

In some embodiments, the centralized object detection sensor network system may be a hybrid centralized object detection sensor network system configured to detect one or more objects and determine their location and position, using a combination of signals received from one or more transponders and one or more other sensors (e.g., image sensors, kinematic sensors, position sensors, LIDAR sensors, acoustic sensors, and the like). In some embodiments, as opposed to transponders, the sensor may not use a free space probing waves and a comparison between the probing wave and a corresponding echo wave to detect objects. FIG. 2A illustrates a hybrid centralized object detection sensor network system 200 comprising one or more transponders 204 that are communicatively connected to the central unit 200 via one or more communication links 106 and one or more sensors 205 that are communicatively connected to the central unit 200 via one or more communication links 207. In some embodiments the communication links 106 may be different type of communication links compared to the communication links 207. The one or more sensors 205 may generate one or more sensor signals usable for determining position, velocity or other characteristics of the one or more objects (e.g., shape, color, temperature, and the like).

Figure 2B:
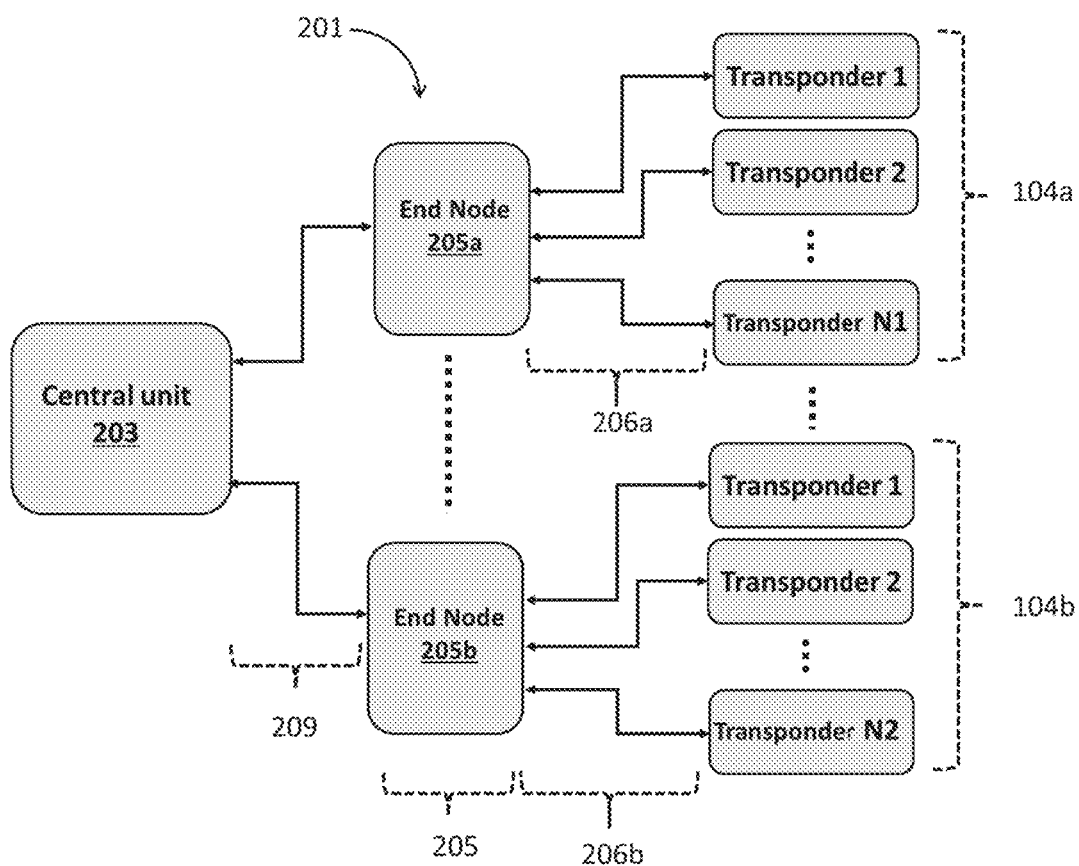
FIG. 2B illustrates a centralized object detection sensor network system having a central unit coupled to a plurality of end nodes through a plurality of primary communication links (node links) where each end node is coupled to a plurality of transponders through a plurality of secondary communication links, according to embodiments.

As illustrated in FIG. 2B, in some embodiments, a centralized object detection sensor network system 201 may include one or more end nodes 205 configured to demultiplex one or more multiplexed probing signal received from the central unit 203 via one or more node links (primary communication links) 209 and multiplexing all echo signals received from one or more transponders (e.g., a first group of transponders 104a), via one or more secondary links 106a, so that they can be transmitted to the central unit 203 using the one or more node links 209.

Each of the one or more end nodes 205 may be configured to distribute probing signals among transponders in a group of transponders and receive echo signals from the group of transponders. Number of transponders included in a group of transponders may be the same or different from the number of transponders in another group of transponders. For example, as shown in FIG. 2B, the end node 205a may be connected to a group of transponders 104a comprising N1 transponders via one or more secondary links 106a, and the end node 205b may be connected to another group of transponders 104b comprising N2 transponders via one or more secondary links 106b, where N1 is not equal to N2.

Each node link of the one or more node links 209 may include one or more of an Ethernet, RF or optical communication link. The use of the end nodes 205 in the centralized object detection sensor network system 201 reduces the cost, complexity, and maintenance of the system, in particular when the distance between transponders and the central unit 203 is long (e.g., in the order of one kilometer or more).

The disclosed centralized object detection sensor network systems and the corresponding system architectures described above may provide several advantages, including, but not limited to:

Distributed sensors and transponders. Relatively more complex, vulnerable and expensive parts of the system (e.g., transmitter, receiver, and signal processor) may be physically decoupled from the transponders and sensors and housed at a remote location (e.g., a base station). Such configuration allows distributing a large number of sensors and transponders over a large area and adjusting their position for optimal detection and sensing with greater efficiency and lower cost. The transponders may be in communication with the central unit by wire, waveguide, optical fibers or other types of connections. In the case of optical fibers, the distance between the transponders and central unit may span from a few centimeters to kilometers.

Advanced raw signal processing methods, advanced and complex signal processing methods (e.g., advanced digital signal processing, machine learning techniques and the like) may not be implemented in sensors and transponders that may be installed large numbers in a wide area and therefore are limited by various constraints (e.g., size, cost, weight, environmental condition, and the like). A sensor network system may still benefit from the above mentioned signal processing methods if they are preformed by a central unit, shared among the sensors and transponders, in which complexity, cost, and environmental constrains may managed more efficiently. Such centralized sensor network may be implemented by capturing the original information contained in the echo signals (e.g., raw signals) at the sensors or transponders and transmitting them unaltered to the central unit. Advantageously, a centralized sensor network system, may also exploit the synchronous processing of raw echo signals received from a plurality of sensors or transponders, to extract certain information about the detected objects, which may not be extracted from individually processed echo signals.

Reduced System Complexity. A centralized object detection sensor network system with shared transmitter, receiver and digital signal processing may reduce the total number of components and the overall hardware and software system complexity.

Radar-Lidar Multiplexing. Transponders may be configured to detect objects using both free space light waves and free space radio waves. Correspondingly, the central unit and the communication links (e.g., optical links) may be shared between lidar and radar systems, thereby further reducing system complexity in applications requiring both sensing modalities (e.g., autonomous vehicles).

Concurrent Sensing. Common signal processing between lidar, radar or other sensing modalities (e.g. cameras, kinematic sensors, position sensors, acoustic sensors) may enhance detection and ranging performance. Exchanging early heuristics through a common signal processing platform may provide mutual reinforcement and validation among the different sensing modalities.

Figure 3A:
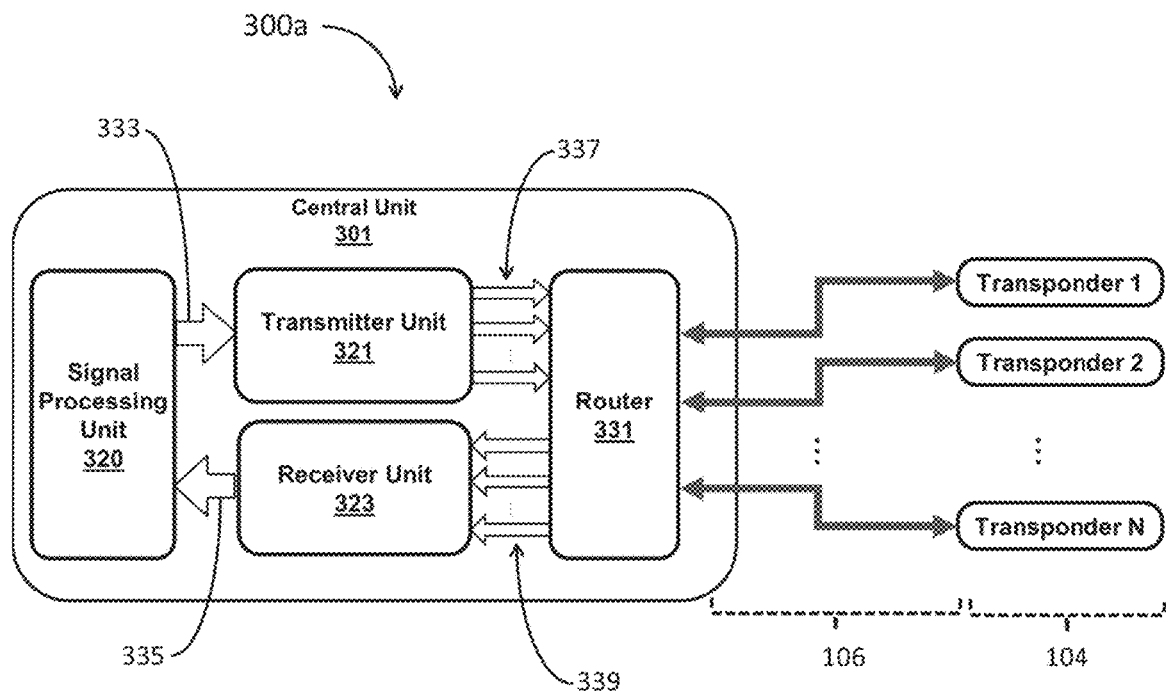
FIG. 3A illustrates a centralized object detection sensor network system having a central unit coupled to a plurality transponders through a plurality of communication links, where the central unit is configured to transmit one probing signal to each transponder and to receive one echo signal from each transponder via each communication link, according to embodiments.

FIG. 3A illustrates an example centralized object detection sensor network system 300a having a central unit 301 coupled to a plurality of transponders 104 through a plurality of communication links 106, where the central unit 301 transmits one probing signal to each of the plurality of transponders 104, and receives one echo signal from each transponder via a communication link. In this example, the central unit 301 includes a signal processing unit 320 that generates a plurality of baseband signals 333 and transmits them to a transmitter unit 321. In some examples, the number of baseband signals in the plurality of baseband signals may be equal to the number of transponders in the centralized object detection sensor network system 300a. The plurality of baseband signals can be analog or digital signals. The transmitter unit 321 may use the plurality of baseband signals 333 to generate a plurality of probing signals 337. The number of probing signals may be equal to the number of baseband signals. In some examples, the transmitter unit 321 may be configured to upconvert the plurality of baseband signals 333 using one or more RF carrier signals or one or more IF carrier signals and amplify the resulting upconverted baseband signals to generate the plurality of probing signals 337. In some cases, each of the baseband signals 333 may be upconverted using a different RF carrier signal or different IF carrier signal (e.g., having a different frequency). In some other examples, the transmitter unit 321 may generate the plurality of probing signals 337 only by amplifying the plurality of baseband signals 333 and/or adjusting relative phase differences associated with the plurality of baseband signals 333. In some embodiments, the plurality of baseband signals 333 can be a plurality of digital signals, and the transmitter unit 321 may be configured to convert them to a plurality of analog signals (e.g., using an digital-to-analog converter) before up-converting and/or amplifying them. The plurality of probing signals 337 may be received by a router unit 331 that couples the plurality of the probing signals 337 to the plurality of links 106.

Each of the plurality of links 106 may deliver a probing signal to a transponder of the plurality of the transponders 104. The transponder may convert the probing signal to one or more free space probing waves directed to an environment. In some examples, the transponder may upconvert the probing signal to an RF probing signal using an RF carrier signal (e.g., generated by a local oscillator in the transponder) and use the resulting RF probing signal to generate the one or more free space probing waves. One or more objects in the environment may generate one or more echo waves by reflecting the one or more free space probing waves. The transponder may receive a portion of the one or more echo waves, generate an echo signal and transmit the echo signal to the central unit 301 via the same link from which the corresponding probing signal was received. In some examples, the transponder may downconvert an RF echo signal received from an antenna unit, using the RF carrier signal, to generate the echo signal.

A plurality of echo signals 339 may be transmitted from the plurality of transponders 104 to the central unit 301 via the plurality of links 106 where each link transmits the echo signal generated by one of the transponders 104. The router 331 may couple the plurality of the echo signals 339 received from the plurality of transponders 104 to the receiver unit 323. The receiver unit 323 may generate a plurality of reflected baseband signals 335 and send them to the signal processing unit 320. The signal processing unit 320 (e.g., a digital signal processing unit) may determine velocities and/or locations of the one or more objects based at least in part on the plurality of reflected baseband signals 335. In some examples, the signal processing unit 320 may generate an object signal based at least in part on the plurality of reflected baseband signals 335. The object signal may be usable for determining the velocities and the positions of the one or more objects. In some cases, the object signal may comprise one or more digital signals, and it can be an optical or an electronic signal. In some examples, the signal processing unit 320 may use the plurality of reflected baseband signals 335 and the plurality of the baseband signals 333 to determine velocities and/or locations of the one or more objects or generate the object signal.

In some examples, the receiver unit 323 may be configured to downconvert the plurality of reflected baseband signals 335 from the plurality of echo signals 339 using the one or more RF carrier signals or one or more IF carrier signals. The one or more RF or IF carrier signals may be generated by one or more local oscillators in the central unit 301. In some other examples, the receiver 323 may generate the plurality of reflected baseband signals 335 only by amplifying the plurality of echo signals 339. In some examples, the reflected baseband signals 335 can be digital signals digitized by the receiver unit 323.

In some embodiments, the plurality of links 106 may be optical links, and the plurality of probing signals 337 and the plurality of echo signals 339 may be optical signals (herein referred to as plurality of: optical probing signals and optical echo signals). In these embodiments, transmitter unit 321 may convert the plurality of baseband signals 333 (electronic signals) to a plurality of optical baseband signals using one or more electric-to-optical (E/O) converters. In some cases, the transmitter unit 321 may first upconvert the plurality of baseband signals using the one or more RF or IF carrier signals and convert the resulting RF or IF signals to the plurality of optical probing signals 337. The E/O converters may generate the plurality of optical signals by modulating amplitude or phase of one or more optical carrier signals using the plurality of baseband signals, the IF signals or the RF signals. Further, the receiver unit 323 may include one or more optical-to-electrical (O/E) converters to generate the plurality of reflected baseband signals 335 using the plurality optical echo signals 339. The O/E converters may generate the plurality of reflected baseband signals 335 using one or more photodetectors.

Figure 3B:
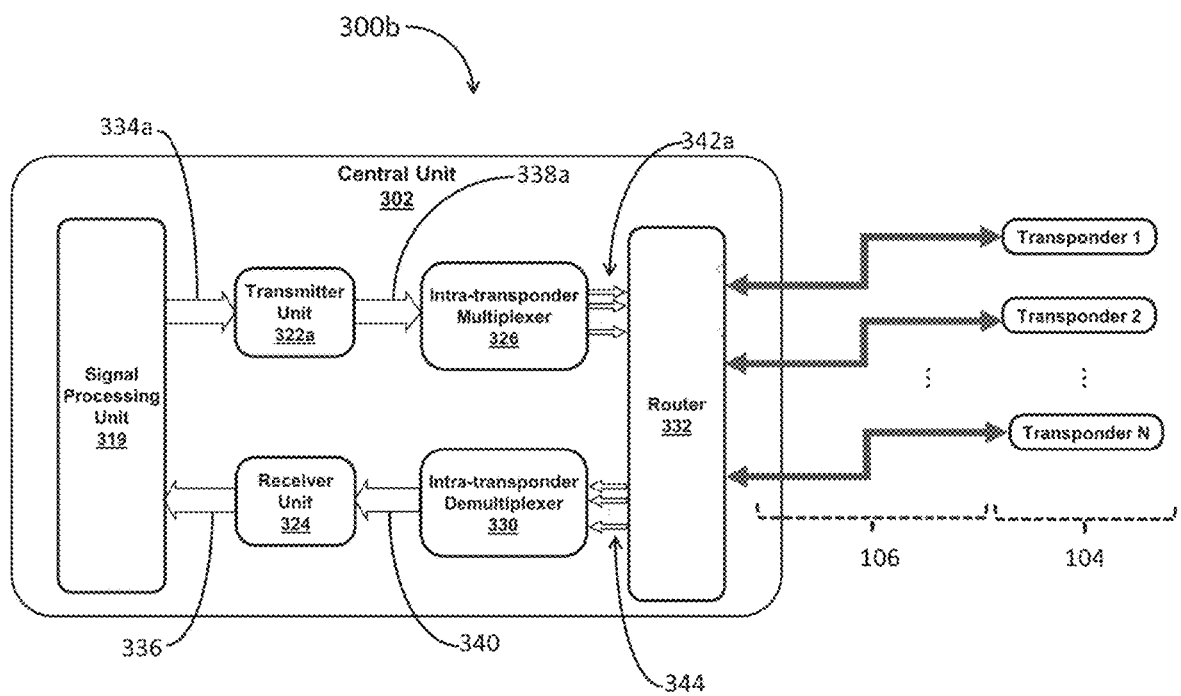
FIG. 3B illustrates a centralized object detection sensor network system having a central unit coupled to a plurality of transponders through a plurality of communication links, where the central unit is configured to transmit a plurality of multiplexed probing signals to the plurality of transponders and to receive a plurality of multiplexed echo signals from each transponder, according to embodiments.

FIG. 3B illustrates a centralized object detection sensor network system 300b having a central unit 302 coupled to a plurality of transponders 104 through a plurality of communication links 106, where the central unit 302 is configured to transmit a plurality of multiplexed probing signals 342a to the plurality of transponders 104 and to receive a plurality of multiplexed echo signals 344 from the plurality of transponders 104. In some embodiments, a multiplexed probing signal and a multiplexed echo signal associated with a transponder of the plurality of transponders 104, may be communicated via a single link. In certain embodiments, the centralized object detection sensor network system 300b can include one or more features, components or functionalities previously described with respect to the centralized object detection sensor network system 300a (FIG. 3A), the details of which may be omitted herein for brevity.

In the example shown, the central unit 302 includes a signal processing unit 319 that generates a plurality of baseband signals 334a comprising a plurality of baseband groups. In some examples, number of baseband groups may be equal to the number of transponders in the centralized object detection sensor network system 300b. Each of the plurality of baseband groups may comprise one or more baseband signals. The signal processing unit 319 transmits the plurality of the baseband signals 334a to a transmitter unit 322a. The transmitter unit 322a may use the plurality of baseband signals 334a to generate a plurality of probing signals 338a comprising a plurality of probing signal groups associated with the plurality of baseband signal groups. Each of the probing signal groups 338a may be associated with a transponder of the plurality of transponders 104. Number of probing signal groups may be equal to the number of baseband groups. In some examples, the transmitter unit 322a may be configured to upconvert the plurality of baseband signals 334a using one or more RF carrier signals or one or more IF carrier signals and amplify the resulting upconverted baseband signals to generate the plurality of probing signals 338a. In some cases, each of the baseband signals 334a may be upconverted using a different RF carrier signal or a different IF carrier signal (e.g., having a different frequency). In some other examples, the transmitter unit 322a may generate the plurality of probing signals 338a only by amplifying amplitudes and or adjusting relative phase differences among the plurality of baseband signals 334. In some embodiments, the plurality of baseband signals 334a can be a plurality of digital signals and the transmitter may be configured to convert them to a plurality of analog signals (e.g., using one or more digital-to-analog converters) before upconverting and/or amplifying them.

The transmitter unit 322a sends the plurality of probing signals 338a, comprising the plurality of probing signal groups, to an intra-transponder multiplexer 326 unit. The intra-transponder multiplexer 326 generates a plurality of multiplexed probing signals 342a where each multiplexed probing signal is associated with one of the plurality of probing signal groups. As such, the number of multiplexed probing signal groups maybe equal to the number of transponders in plurality of transponders 104. The intra-transponder multiplexer 326 may generate each multiplexed probing signal using the one or more probing signals in the corresponding probing signal group and based on a signal multiplexing method (e.g., an electronic or an optical signal multiplexing method).

A router 332 (e.g., an optical router or and electronic router) may receive the plurality of multiplexed probing signals 342a and couple them to the plurality of links 106 links where each multiplexed probing signal is transmitted to a transponder via a link. The transponder may include a demultiplexer unit that receives the multiplexed probing signal, generates the one or more probing signals associated with a probing signal group and use them to generate one or more free space probing waves directed to an environment. In some examples, the transponder may upconvert the one or more probing signals to one or more RF probing signals using one or more RF carrier signals (e.g., generated by one or more ocal oscillators) and use the resulting RF probing signals to generate the one or more free space probing waves. One or more objects in the environment may generate one or more echo waves by reflecting the one or more probing waves. The transponder may receive a portion of the one or more echo waves, and generate one or more echo signals. In some cases, the one or more echo signals may be generated by downconverting one or more RF echo signals received from an antenna unit (e.g., using one or more IF carrier signals or one or more RF carrier signals) and the one or more echo signal may comprise one or more IF echo signals or one or more reflected baseband signals. The transponder may include a multiplexer unit configured to generate a multiplexed echo signal using the one or more echo signals. In some examples, the multiplexed echo signal may comprise an echo signal group. The transponder may transmit the multiplexed echo signal to the central unit 302 via the same link from which the corresponding multiplexed probing signal was received.

A plurality of multiplexed echo signals may be transmitted from the plurality of transponders 104 to the central unit 302 via the plurality of links 106 where each link transmits the multiplexed echo signal generated by one of the transponders. The router 332 may couple the plurality of the multiplexed echo signals 344 received from the plurality of transponders 104 to an intra-transponder de-multiplexer unit 330 configured to generate a plurality of echo signals 340 comprising a plurality of echo signal groups associated with the plurality of probing signal groups. The plurality of echo signals 340 may be received by a receiver unit 324. The receiver unit 324 may generate a plurality of reflected baseband signals 336 and send them to the signal processing unit 319. The signal processing unit 319 may determine velocities and/or locations of the one or more objects based at least in part on the plurality of reflected baseband signals 336. In some examples, the signal processing unit 319 may generate an object signal based at least in part on the plurality of reflected baseband signals 336. The object signal may be usable for determining the velocities and the positions of the one or more objects. In some cases, the object signal may comprise one or more digital signals, and it can be an optical or an electronic signal. In some examples, the signal processing unit 319 may use the plurality of reflected baseband signals 336 and the plurality of the baseband signals 334a to determine velocities and/or locations of the one or more objects or generate the object signal. In some examples, the receiver unit 324 may be configured to downconvert the plurality of reflected baseband signals 336 from the plurality of echo signals 340 using the one or more carrier signals (e.g., RF carrier signals or IF carrier signals). In some other examples, the receiver 324 may generate the plurality of reflected baseband signals 336 only by amplifying the plurality of echo signals 340 and/or adjusting relative phase differences among the plurality of reflected baseband signals.

In some embodiments, the plurality of links 106 (in the system 300b) may be optical links, and the plurality of the probing signals 338a, the plurality of multiplexed probing signals 342a, the plurality of echo signals 344 and the plurality of multiplexed echo signals 340 may be optical signals (herein referred to as plurality of: optical probing signals, optical multiplexed probing signals, optical echo signals and optical multiplexed echo signals). In these embodiments, transmitter unit 322a may convert the plurality of baseband signals 334a to a plurality of optical probing signals using one or more electric-to-optical (E/O) converters. In some cases, the transmitter unit 322a may first upconvert the plurality of baseband signals using the one or more RF or IF carrier signals and convert the resulting RF or IF signals to optical probing signals. The E/O converters may generate the plurality of optical probing signals by modulating amplitude or phase of one or more optical carrier signals using the baseband, IF or RF signals. The receiver unit 324 may include one or more optical-to-electrical (O/E) converters to generate the plurality of reflected baseband signals 336. The O/E converters may generate the plurality of reflected baseband signals 336 using one or more photodetectors. In these embodiments, the intra-transponder multiplexer 326, the intra-transponder demultiplexer 330, the multiplexers unit in each transponder and the demultiplexer unit in each transponder, may comprise optical multiplexers and optical demultiplexers, configured to multiplex and demultiplex optical signals using optical multiplexing/demultiplexing methods (e.g., wavelength division multiplexing, time division multiplexing and the like). The optical intra-transponder multiplexer 326 may generate a plurality of optical multiplexed probing signals 342a using the plurality of optical probing signals 338a. The optical intra-transponder demultiplexer 330 may generate a plurality of optical echo signals 340 using the plurality of optical multiplexed echo signals 344. Further in these embodiments each transponder may include one or more O/E converters to convert the plurality of optical probing signals (generated one or more optical demultiplexers) to electronic signals, and one or more O/E converters to generate the plurality of optical echo signals.

Figure 3C:
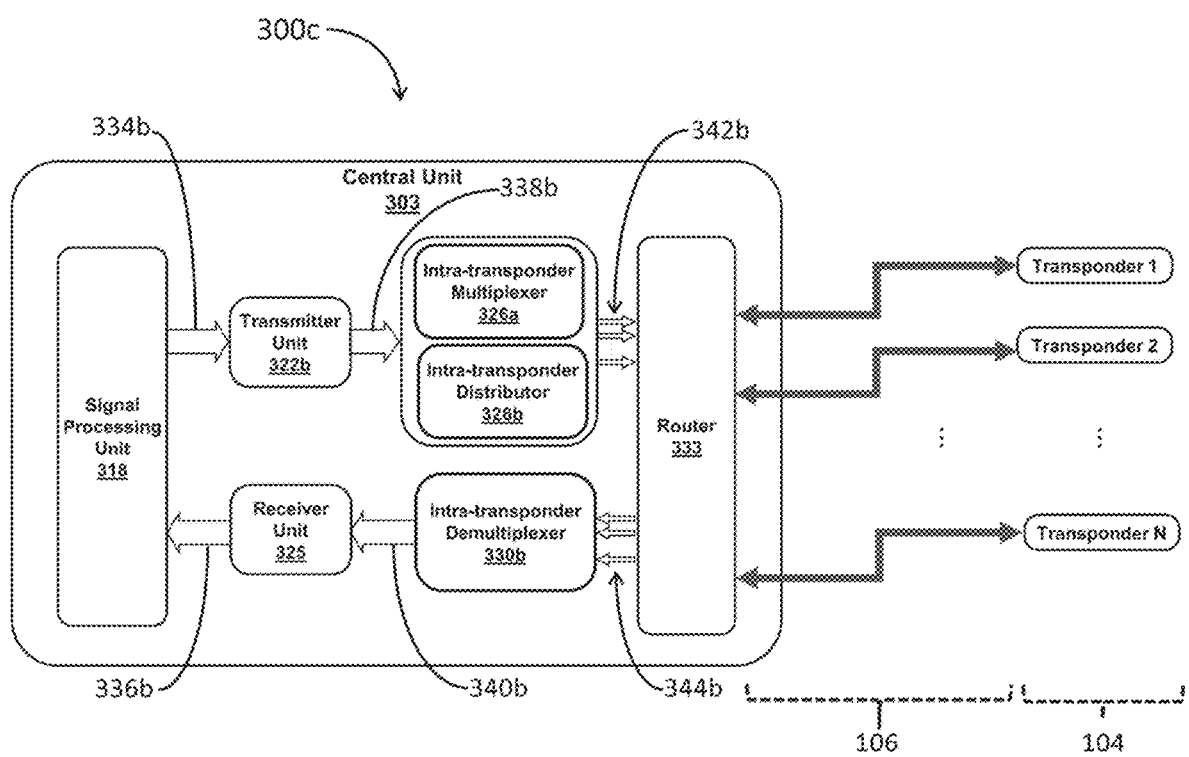
FIG. 3C illustrates a centralized object detection sensor network system having a central unit coupled to a plurality of transponders through a plurality of communication links, where the central unit is configured to distribute a multiplexed probing signal among the plurality of transponders and to receive a plurality of multiplexed echo signals from the plurality of transponders, according to embodiments.

FIG. 3C illustrates a centralized object detection sensor network system 300c having a central unit 303 coupled to a plurality of transponders 104 through a plurality of communication links 106, where the central unit 303 distributes a plurality of multiplexed probing signals 342b among the plurality of transponders 104 and receives a plurality of multiplexed echo signals 344 from the plurality of transponders 104. In certain embodiments, the centralized object detection sensor network system 300c can include one or more units, functionalities or previously described with respect to the centralized object detection sensor network system 300a (FIG. 3A) or 300b (FIG. 3B) described above, the details of which may be omitted herein for brevity.

In the example shown (FIG. 3C), the central unit 303 includes a signal processing unit 318 that generates a plurality of baseband signals 334b and transmits them to a transmitter unit 322b. The transmitter unit 322b may use the plurality of baseband signals 334b to generate a plurality of probing signals 338b. In some examples, the transmitter unit 322b may be configured to upconvert the plurality of baseband signals 334b using one or more RF or IF carrier signals and amplify the resulting one or more RF or IF signals (upconverted baseband signals) to generate the plurality of probing signals 338b. In some cases, each baseband signal may be upconverted using a different RF or IF carrier signal (e.g., having a different frequency). In some other examples, the transmitter unit 322b may generate the plurality of probing signals 338b only by amplifying amplitudes and or adjusting relative phase differences of the plurality of baseband signals 334b. In some embodiments, the plurality of baseband signals 334b can be a plurality of digital signals and the transmitter unit 323b may be configured to convert them to a plurality of analog signals before upconverting and/or amplifying them.

The transmitter unit 322*b* sends the plurality of probing signals 338*b* to an intra-transponder multiplexer unit 326*a* that generates a multiplexed probing signal based on a signal multiplexing method (e.g., an electronic or an optical signal multiplexing method). Next, an inter-transponder distributor 326*b* (e.g., an electronic or optical inter-transponder distributor) generates a plurality of probing signals 342*b* comprising one or more copies of the multiplexed probing signal generated by the intra-transponder multiplexer unit 326*a*. In some examples, the inter-transponder distributor 326*b* may be an electronic or optical coupler with an input port and a plurality of output ports where portions (e.g., equal portions) of a signal received by the input port are output from each output port. In some such examples, number the plurality of output ports may equal to the number of transponders in the centralized object detection sensor network system 300*c*.

Still referring to FIG. 3C, a router 333 (e.g., an optical router or and electronic router) may receive the plurality of multiplexed probing signals 342*b* and couple them to the plurality of links 106 links where each multiplexed probing signal is transmitted to a transponder (e.g., transponder 1, transponder 2, . . . or transponder N) via a link. The transponder may include a demultiplexer unit that receives the multiplexed probing signal, generates the plurality of probing signals 338*b* and uses the plurality of probing signals 338*b* to generate one or more free space probing waves directed to an environment. In some examples, where the plurality of probing signals 338*b* comprises the plurality of baseband signals 334*b* or IF signals, the transponder may upconvert the one or more probing signals using an RF carrier signal and use the resulting RF probing signal to generate the one or more free space probing waves. One or more objects in the environment may generate one or more echo waves by reflecting the one or more probing waves. The transponder may receive a portion of the one or more echo waves, and to generate one or more echo signals. The transponder may include a multiplexer unit configured to generate a multiplexed echo signal using the one or more echo signals. The transponder may transmit the multiplexed echo signal to the central unit 303 via the same link from which the corresponding multiplexed probing signal was received. In some examples, the transponder may downconvert one or more RF echo signals received from an antenna unit, using one or more RF carriers, to generate the one or more echo signals. In these examples, each echo signal, may be comprise a reflected baseband signal or an IF carrier modulated by the reflected baseband signal A plurality of multiplexed echo signals may be transmitted from the plurality of transponders 104 to the central unit 303 via the plurality of links 106 where each link transmits the multiplexed echo signal generated by one of the transponders. The router 333 may couple the plurality of the multiplexed echo signals 344*b* received from the plurality of transponders 104 to an intra-transponder de-multiplexer unit 330*b* configured to generate a plurality of echo signals 340*b* comprising a plurality of echo signal groups associated with the plurality of transponders 104. The plurality of echo signals 340*b* may be received by a receiver unit 325. The receiver unit 325 may generate a plurality of reflected baseband signals 336*b* and send them to the signal processing unit 318. The signal processing unit 318 may determine velocities and/or locations of the one or more objects based at least in part on the plurality of reflected baseband signals 336*b*. In some examples, the signal processing unit 318 may generate an object signal based at least in part on the plurality of reflected baseband signals 336*b*. The object signal may be usable for determining the velocities and the positions of the one or more objects. In some cases, the object signal may comprise one or more digital signals, and it can be an optical or an electronic signal. In some examples, the signal processing unit 318 may use the plurality of reflected baseband signals 336*b* and the plurality of the baseband signals 334*b* to determine velocities and/or locations of the one or more objects or generate the object signal. In some examples, the receiver unit 325 may be configured to downconvert the plurality of reflected baseband signals 336*b* from the plurality of echo signals 340*b* using the one or more RF carrier signals and/or using the one or more IF signals. In some other examples, where the plurality of echo signals 344*b* comprise a plurality of baseband signals, the receiver 325 may generate the plurality of reflected baseband signals 336*b* only by amplifying the plurality of echo signals 340. In some examples, the reflected baseband signals 336*b* can be digital signals digitized by the receiver unit 325.

In some embodiments, the plurality of links 106 may be optical links, and the plurality of the probing signals 338*b*, the plurality of multiplexed probing signals 342*b*, the plurality of echo signals 340*b* and the plurality of multiplexed echo signals 344*b* may be optical signals (herein referred to as plurality of: optical probing signals, optical multiplexed probing signals, optical echo signals and optical multiplexed echo signals). In these embodiments, transmitter unit 323 may convert the plurality of baseband signals 334*b* to a plurality of optical probing signals using one or more electric-to-optical (E/O) converters. In some cases, the transmitter unit 323 may first upconvert the plurality of baseband signals using the one or more RF or IF carrier signals and convert the resulting RF or IF signals to an optical probing signals. The E/O converters may generate the plurality of optical probing signals by modulating amplitude or phase of one or more optical carrier signals using the baseband, IF or RF signals. The receiver unit 325 may include one or more optical-to-electrical (O/E) converters to generate the plurality of reflected baseband signals 336*b*. The O/E converters may generate the plurality of reflected baseband signals 336*b* using one or more photodetectors. In these embodiments, the intra-transponder multiplexer 326*b*, the intra-transponder demultiplexer 330*b*, the multiplexers unit in each transponder and the demultiplexer unit in each transponder, may comprise optical multiplexers and optical demultiplexers, configured to multiplex and demultiplex optical signals using optical multiplexing/demultiplexing methods (e.g., wavelength division multiplexing, time division multiplexing and the like). The optical intra-transponder multiplexer 326*b* may generate a plurality of optical multiplexed probing signals 342*b* using the plurality of optical probing signals 338*b*. The optical intra-transponder demultiplexer 330*b* may generate a plurality of optical echo signals 340*b* using the plurality of optical multiplexed echo signals 344*b*. Further in these embodiments each transponder may include one or more O/E converters to convert the plurality of optical probing signals (generated one or more optical demultiplexers) to electronic signals, and one or more O/E converters to generate the plurality of optical echo signals.

Figure 4:
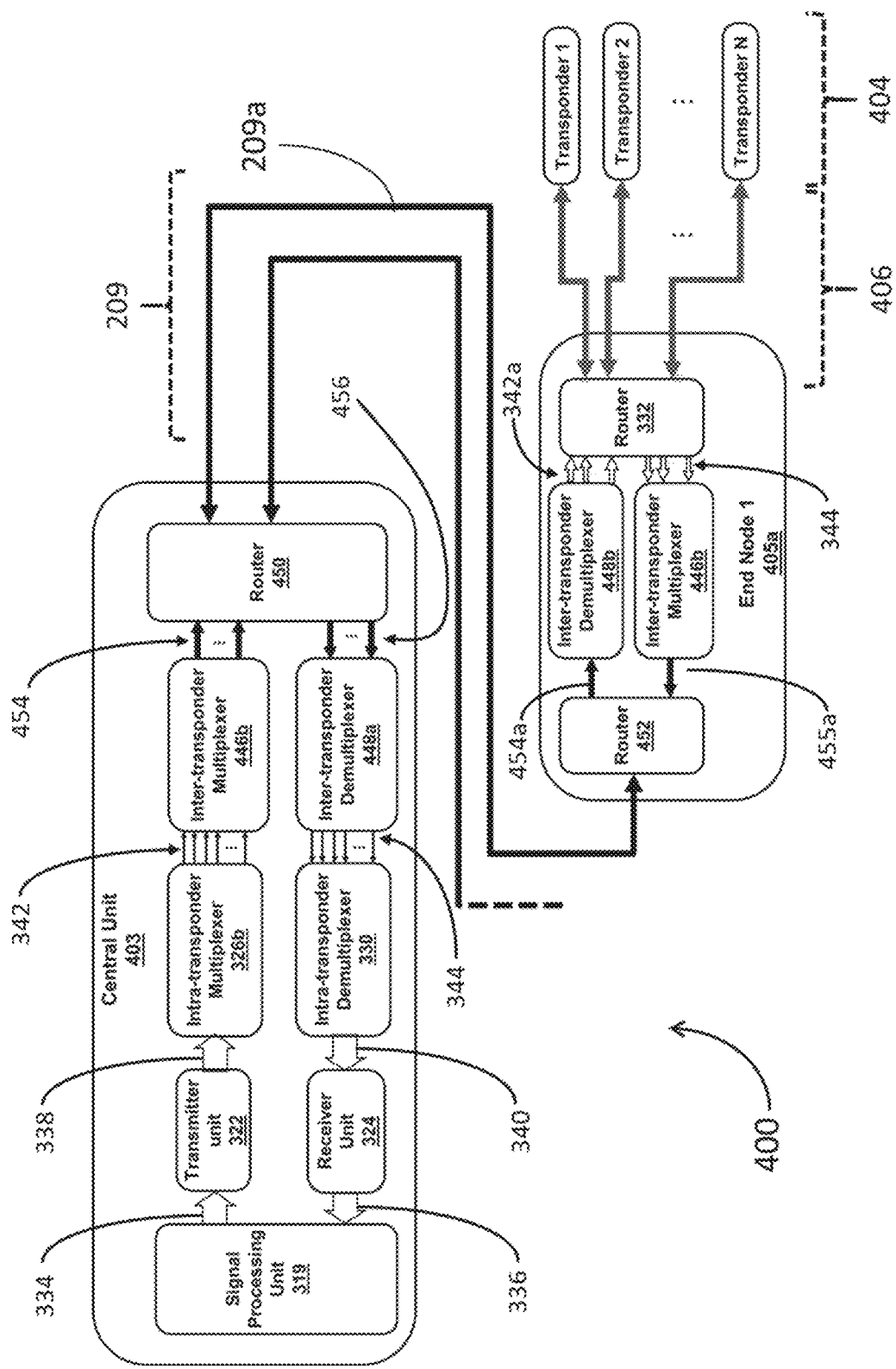
FIG. 4 illustrates a centralized object detection sensor network system having a central unit coupled to a plurality of end nodes through a plurality of primary communication links (node links) where each end node transmits a plurality of probing signals to each transponder and receives a plurality of echo signals from each transponder, according to embodiments.

FIG. 4 illustrates a centralized object detection sensor network system 400 having a central unit 403 coupled to a plurality of end nodes through a plurality of node links 209 where each end node transmits a plurality of probing signals to each transponder and receives a plurality of echo signals from each transponder. In certain embodiments, the centralized object detection sensor network system 400 can include one or more features of some of the embodiments previously described with respect to the centralized object detection sensor network system 300a (FIG. 3A), 300b (FIG. 3B) and/or 300c (FIG. 3C) described above, the details of which may be omitted herein for brevity.

In the illustrated example, the central unit 403 includes a signal processing unit 319 that generates a plurality of baseband signals 334 and transmits them to a transmitter unit 322. The transmitter unit 322 may use the plurality of baseband signals 334 to generate a plurality of probing signals 338. In some examples, the transmitter unit 323 may be configured to upconvert the plurality of baseband signals 334 using one or more RF carrier signals and amplify the resulting upconverted baseband signals to generate the plurality of probing signals 338. In some cases, each baseband signal may be upconverted using a different RF carrier signal (e.g., having a different frequency). In some other examples, the transmitter unit 322 may generate the plurality of probing signals 338 only by amplifying amplitudes and or adjusting relative phase differences of the plurality of baseband signals 334. In yet other examples, the transmitter unit 322 may be configured to upconvert the plurality of baseband signals 334 using one or more IF carrier signals and amplify the resulting upconverted baseband signals to generate the plurality of probing signals 338. In some examples, each baseband signal may be upconverted using a different IF signal (e.g., having a different frequency). In some embodiments, the plurality of baseband signals 334 can be a plurality of digital signals and the transmitter may be configured to convert them to a plurality of analog-signals before up-converting and/or amplifying them.

The transmitter unit 322 sends the plurality of probing signals 338 to an intra-transponder multiplexer unit 326 that generates a plurality of multiplexed probing signals 342. Each multiplexed probing signal may comprise a group of probing signals associated with one of the transponders of the plurality of transponders. The number of multiplexed probing signals in the plurality of multiplexed probing signals may be equal to the number of transponders in the centralized object detection sensor network system 400. Next, an inter-transponder multiplexer 446a generates a plurality of node signals 454 where each node signal is a multiplexed signal comprising one or more multiplexed probing signals associated with the transponders fed by the corresponding node. The plurality of multiplexed probing signals 342 and the plurality of node signals 454 may be generated using optical or electronic multiplexing methods.

A router 450 (e.g., an optical router or and electronic router) may receive the plurality of node signals 454 and couple them to the plurality of node links 209 where each node signal is transmitted to an end node of the plurality of end nodes via a link. Each end node may be configured to: distribute the plurality of probing signals associated with a received node signal among a plurality of transponders, receive a plurality of echo signals from the plurality of transponders and generate an echo node signal that is transmitted back to the router 450 (in the central unit 403), for example, via the link (used to deliver the node signal to the end node). In some embodiments, each end node may include, one or more of routers, an inter-transponder demultiplexer, and an inter-transponder multiplexer. As an example, a first end node 405a may receive a first node signal from a first node link 209a and distribute it among a first plurality of transponders 404 (for example N transponders). The first node signal may be received by the router 452 that couples the end node signal 454a to the inter-transponder demultiplexer 448b. The inter-transponder demultiplexer 448b generates a plurality of multiplexed probing signals 342a and sends them to the router 332 that transmits to the first plurality of transponders 404 via a first plurality of links 406. The first plurality of transponders 404 may generate a first plurality of multiplexed echo signals and transmit them to the first end node 405a via the first plurality of links 406 (e.g., based on the process described with respect to FIG. 3B or FIG. 3C). The router 332 may couple the plurality of the multiplexed echo signals 344 received from the plurality of transponders 404 to the inter-transponder multiplexer 446b that generates an echo node signal 455a (by multiplexing multiplexed echo signals received from the plurality of transponders 404). The router 452 couples the echo node signal 455a to the first node link 209a.

Still referring to FIG. 4, a plurality of echo node signals 456 may be received by the router 450 that couples them to the inter-transponder demultiplexer 448a. The inter-transponder demultiplexer 448a generates a plurality of multiplexed echo signals 344 and send them to the intra-transponder demultiplexer 330. The intra-transponder demultiplexer 330 generates a plurality of echo signals 340. The plurality of echo signals 340 may be received by a receiver unit 324 that generates a plurality of reflected baseband signals 336 and sends them to the signal processing unit 319. The signal processing unit 319 may use the plurality of reflected baseband signals 336 to determine velocities and/or locations of the one or more objects. In some embodiments, the signal processing unit 319 may generate one or more object signals usable for determining velocities and locations of the one or more objects.

In some examples, the receiver unit 324 may be configured to downconvert the plurality of reflected baseband signals 336 from the plurality of echo signals 340 using the one or more RF carrier signals and/or using one or more IF signals. In some other examples, where the plurality of echo signals 344 comprise a plurality of baseband signals, the receiver unit 324 may generate the plurality of reflected baseband signals 336 only by amplifying the plurality of echo signals 340. In some examples, the reflected baseband signals 336 can be digital signals digitized by the receiver unit 324.

In some embodiments, the plurality of links node links 209 and links 406 may be optical links, and the plurality of the probing signals 338, the plurality of multiplexed probing signals 342, the plurality of node signals 454, the plurality of echo node signals 456, the plurality of echo signals 340 and the plurality of multiplexed echo signals 344 may be optical signals. In these embodiments, transmitter unit 324 may convert the plurality of baseband signals 334 to a plurality of optical baseband signals or to a plurality of optical upconverted baseband signals (e.g., by modulating amplitude or phase of one or more optical carriers signals using the baseband signals or the upconverted baseband signals). Upconverted baseband signals can be baseband signals upconverted using an RF carrier or an IF signal. Further, the receiver unit 324 may convert the plurality optical echo signals 340 to the plurality of reflected baseband signals 336. In these embodiments the intra-transponder multiplexer 326, the inter-transponder multiplexer 446a, the inter-transponder demultiplexer 448b, the inter-transponder multiplexer 446b can be optical multiplexers and optical demultiplexer units that function based on optical multiplexing and demultiplexing methods (e.g., wavelength division multiplexing, time division multiplexing and the like).

Figure 5:
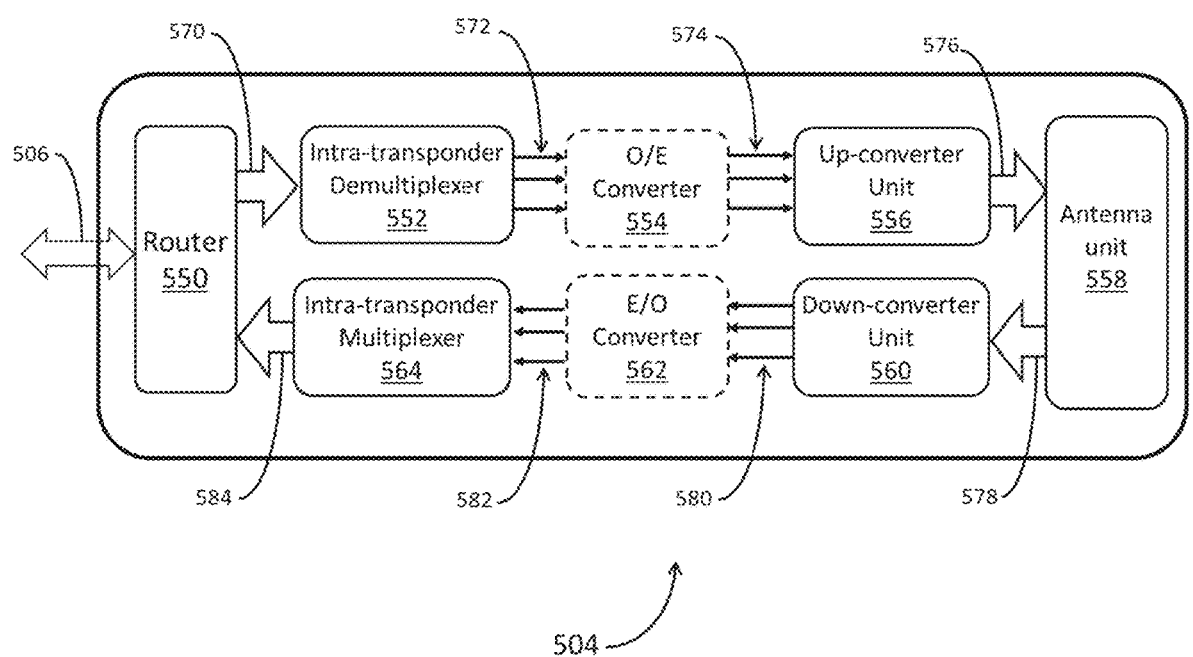
FIG. 5 illustrates a transponder of a centralized object detection sensor network system configured to receive/transmit optical and or electronic probing/echo signals from/to the central unit, according to embodiments.

FIG. 5 illustrates an example transponder 504 of a centralized object detection sensor network system configured to receive/transmit probing/echo signals from/to a central unit of the centralized object detection sensor system. The transponder 504 may be, e.g., a radar transponder configured: to receive one or more probing signals or a multiplexed probing signal, convert them to free space probing waves, receive free space echo waves and convert them to a multiplexed echo signal or one or more echo signals. In the illustrated example, the transponder 504 may comprise a router 550 configured to couple a multiplexed probing signal 570 from a link 506 to an intra-transponder multiplexer unit 552 that generates a plurality of probing signals 572. The router 550 can be and electronic router configured for coupling electronic signals from a link to a device or an optical router configured for coupling optical signals from a link to a device. In some examples, the multiplexed probing signal 570 and the plurality of probing signals 572 may be optical signals, and the intra-transponder multiplexer unit 552 may be an optical demultiplexer. In these examples, an optical-to-electrical (O/E) converter 554 may convert the plurality of optical probing signals to a plurality of electronic probing signals 574. In some other examples, the plurality of probing signals 572 may be electronic probing signals in which case they may be directly transmitted to an upconverter unit 556 or an antenna unit 558 as RF probing signals 576. In such examples the transponder 504 may not include the 0/E converter 554. The electronic probing signals 574, or electronic probing signals 572, can be baseband signals (e.g., generated by a central unit), up-converted basedband signals (up converted to intermediate frequencies (IFs) or radio frequencies (RFs)). In some cases, where the electronic probing signals 574, or electronic probing signals 572 are baseband signals or based signals upconverted to IFs, the up-converter unit 556 may upconvert them using on or more RF carriers to generate one or more RF probing signals 576. In some examples, the optical probing signals 572, may comprise one or more optical carriers whose amplitude or phase are modulated by baseband signals, up-converted basedband signals (up converted to intermediate frequencies (IFs) or radio frequencies (RFs)). The antenna unit 558 may comprise one or more antennas configured to convert one or more RF probing signals to free space probing waves and receive one or more free space echo waves and convert them to echo RF echo signals 578. In some cases, a downconverter unit 560 may then downconvert the one or more echo RF echo signals 578 to IF signals (one or more IF carriers modulated by baseband signals) or baseband signals to generate one or more echo signals 580. In some cases, the one or more echo signals 580 may be directly transmitted to an intra-transponder multiplexer unit 564 (e.g., an electronic multiplexer unit). The intra-transponder multiplexer unit 564 may use the one or more echo signals 582 to generate a multiplexed echo signal 584 (an electronic multiplexed signal). In some other cases, an electrical-to-optical (E/O) converter 562 may convert the one or more echo signals 580 (e.g., electronic echo signals) to one or more optical echo signals 582 and send them to the intra-transponder multiplexer unit 564 (e.g., an optical multiplexer unit). The intra-transponder multiplexer unit 564 may use the one or more optical echo signals 582 to generate a multiplexed echo signal 584 (an optical multiplexed signal). The router 550 may then couple the multiplexed echo signal 584 to the link 506.

In some embodiments, for example the system shown in FIG. 3A, a probing signal received by the transponder may not be a multiplexed probing signal. In these embodiments the transponder 504 may not include the intra-transponder demultiplexer 552 and the intra-transponder multiplexer 564. In these embodiments, the plurality of probing signals 572 (electronic or optical) may be received directly from the router 550 and the plurality of echo signals (electronic or optical) may be transmitted directly to the router 550. In some embodiments, where the multiplexed probing signal 570 and the multiplexed echo signal 584 are electrical signals, transponder 504 may not have an optical-to-electrical converter 554 or an electrical-to-optical converter 562.

In some embodiments, the transponder 504 may further comprise one or more analog-to-digital (A-to-D) and one or more digital-to-analog (D-to-A) converters. In some examples the one or more D-to-A converters may be used to convert one or more digital probing signals received from the central unit to one or more analog signals, and one or more A-to-D converts may be used to convert the one or more echo signals 582 or the multiplexed echo signal 584 generated by the transponder 504 to digital signals before transmitting them to the central unit.

In some embodiments, the transponder 504 may further comprise one or more signal processing units (e.g., digital signal processing units) configured to transform one or more echo signals 580 generated by the transponder 504 to one or more compressed echo signals before multiplexing them or transmitting them to the central unit. In some examples, an information content of the one or more compressed echo signals may be identical to the one or more echo signals but the one or more compressed echo signals may require less bandwidth to be transmitted to the central unit. The information content may pertain information usable by the central unit to generate an object signal ort determine velocities and/or positions of one or more objects.

In some other embodiments, the one or more signal processing units may be configured to transform the one or more echo signals 580 to one or more pre-processed echo signals where the one or more pre-processed echo signals may be used by the central processing unit to generate an object signal or determine the position and/or velocities of one or more objects. In some such embodiments, generating an object signal or determining the position and/or velocities of one or more objects using one or more pre-processed echo signals (instead of the one or more echo signals) may reduce an amount of processing or an amount of computational resources used by the central unit.

Figure 6A:
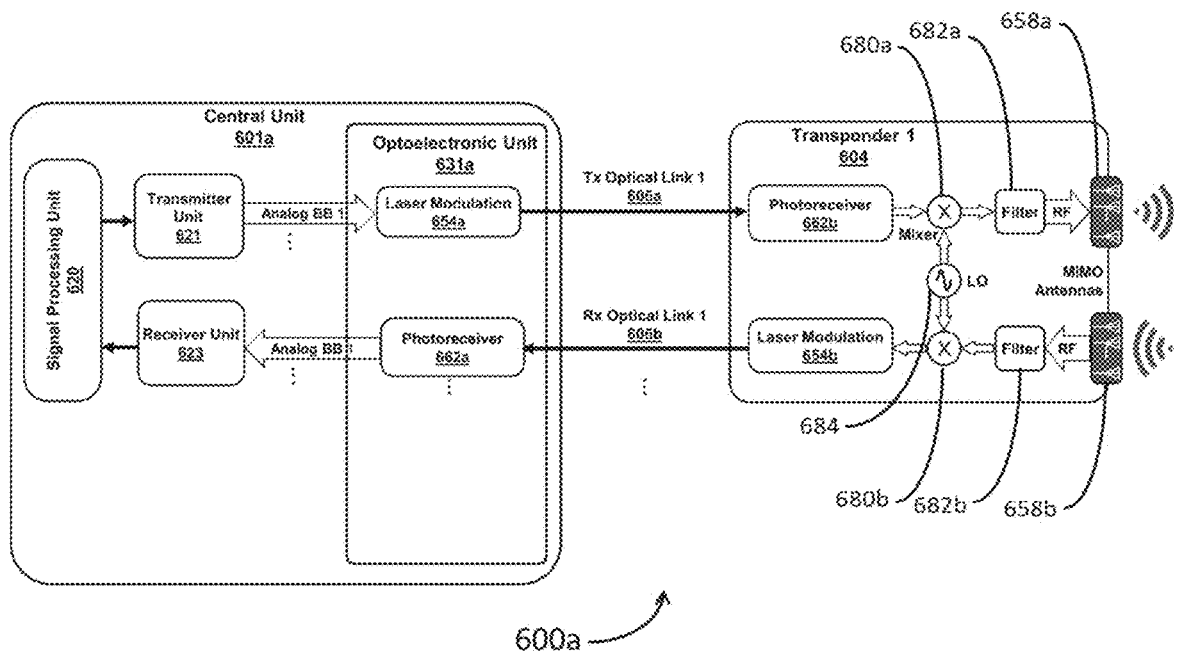
FIG. 6A illustrates a centralized object detection sensor network system having a central unit coupled to a plurality transponders through a plurality of optical communication links, where the optical communication links for sending and receiving optical probing signals between the central unit and each of the transponders are separate. Each of the transponders first convert the optical probing signals to electronic probing signals and then up-convert them to RF frequencies to generate the free space waves, according to embodiments.

FIG. 6A illustrates an example implementation of the centralized object detection sensor network system 300a described above. The centralized object detection sensor network system 600a may comprise a central unit 601a coupled to a plurality transponders through a plurality of optical links where optical probing signals and optical echo signals are transmitted using separate links and the links are optical communication links.

In this example, the central unit 601a includes a signal processing unit 620 that generates a plurality of baseband signals (electronic signals) and transmits them to a transmitter unit 621. In some examples, the plurality of baseband signals may be digital electronic signals. The transmitter unit 621 may use the plurality of baseband signals to generate a plurality of probing signals that comprise a plurality of analog baseband signals. The plurality of probing signals may be transmitted to an optoelectronic unit 631a that comprises a plurality of electrical-to-optical and optical-to-electrical converters. The optoelectronic unit 631 may convert the plurality of probing signals (electronic probing signals) to a plurality of optical probing signals. In some examples, an electrical-to-optical converter may comprise a directly modulated or an externally modulated laser. In some examples, an optical-to-electrical converter may comprise a photoreceiver (e.g., an amplified photodetector). Each optical probing signal may be transmitted to a transponder via an optical link (e.g., a Tx optical link). The transponder may generate a corresponding optical echo signal and transmit it back to the optoelectronic unit 631a via another optical link (e.g., an Rx optical link).

In the example shown, a first optical probing signal may be generated by directly modulating a laser 654a in the optoelectronic unit 631a. The first optical probing signal may be transmitted to a photoreceiver 662a in a first transponder 604 via a first optical link 606a. The photoreceiver 662a may convert the first optical probing signal to an electronic probing signal (an electronic baseband signal). Subsequently, a first RF mixer 680a may generate an RF probing signal by upconverting the probing signal using a local oscillator (LO) 684 that generates the corresponding RF carrier signal. In some examples, a first RF filter 682a may be used to eliminate the spurious spectral components of the RF probing signal that may be generated during the upconversion process by the mixer 680a. The resulting RF probing signal may be delivered to a first antenna unit 658a configured to convert the RF probing signal to a free space probing wave. The corresponding free space echo wave may be received by another antenna 658b unit that converts the free space echo wave to an RF echo signal (reflected by one or more objects). The RF echo signal may be filtered using a second RF filter 682b and down converted by a second RF mixer 680b (fed by LO 684) to generate a first echo signal (electronic signal) corresponding the first probing signal. A direct or external modulation of a laser 654b in the first transponder 604 may convert the first echo signal to a first optical echo signal. The first optical echo signal may be transmitted to the central unit 601a via a second optical link 606b. A photoreceiver 662a may convert the first optical echo signal to an analog reflected baseband signal and send it to a receiver unit 623. The receiver unit may convert the analog reflected baseband signal to a digital reflected baseband signal that can be processed by the signal processing unit 620. The signal processing unit may determined the velocities and positions of one or more objects and generate an object signal based at least in part on the digital reflected baseband signal.

Figure 6B:
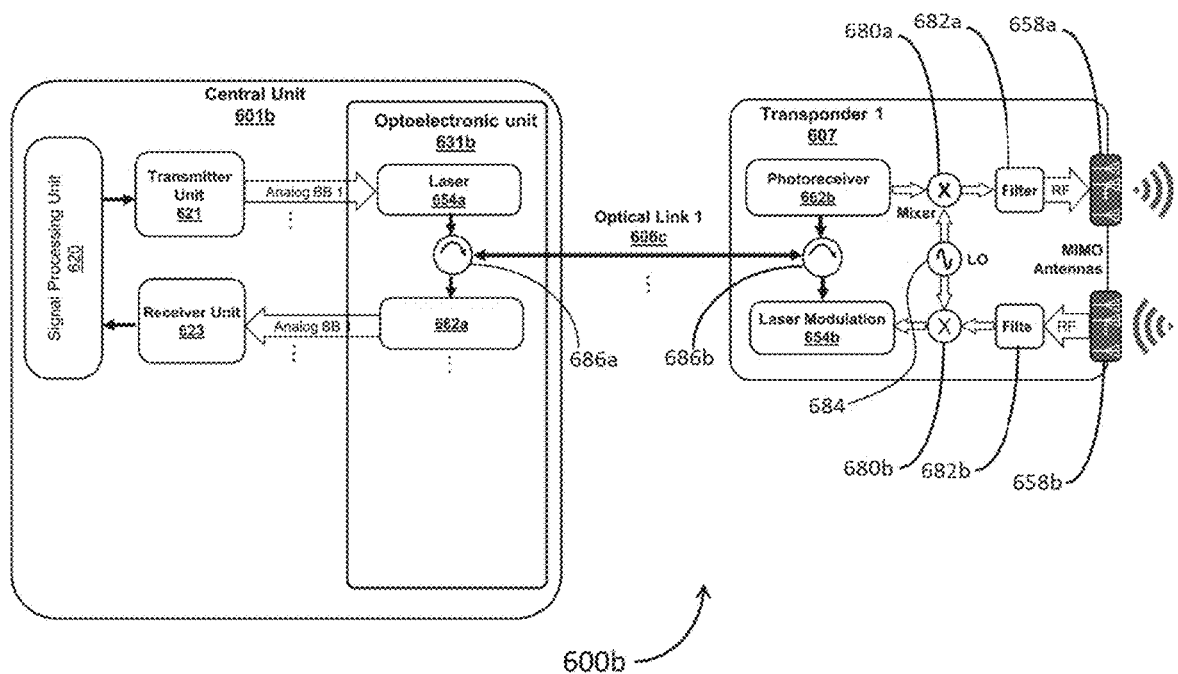
FIG. 6B illustrates a centralized object detection sensor network system having a bidirectional optical link for sending and receiving optical signals between a central unit and each of the transponders. Each of the transponders first convert the optical probing signals to electronic probing signals and then up-convert them to RF frequencies to generate the free space waves, according to embodiments

FIG. 6B illustrates an alternative implementation of the centralized object detection sensor network system 600a described above with respect to FIG. 6A and may comprise one or more features, components and functionalities described with respect to the centralized object detection sensor network system 600a. The centralized object detection sensor network system 600b, shown in FIG. 6B, may comprise a central unit 601b coupled to a plurality transponders through a plurality of links where the probing signals and the echo signals are transmitted using separate links, which are optical communication links. The generation of probing signals and processing of the echo signals in the central unit 601b of the system 600b can be similar to those described above with respect to the central unit 601a of the system 600a (FIG. 6A). However, the optoelectronic unit 631b of the system 600b may include an optical circulator (e.g., optical circulator 686a) for each of pairs of lasers and photoreceivers. For example, the optical circulator 686a may be configured to couple a first optical probing signal generated by a first laser 654a to an optical link 606c, and couple the corresponding optical echo signal from the same optical link 606c to a first photoreceiver 662a. Similarly, each transponder of the centralized object detection sensor network system 600b may include an optical circulator. For example, a first transponder 607 may include an optical circulator 686b configured to couple the first optical probing signal received from the optical link 606c to a photoreceiver 662b (in the first transponder 607) and couple the corresponding optical echo signal, generated by a laser 654a, to the same optical link 606c.

Figure 6C:
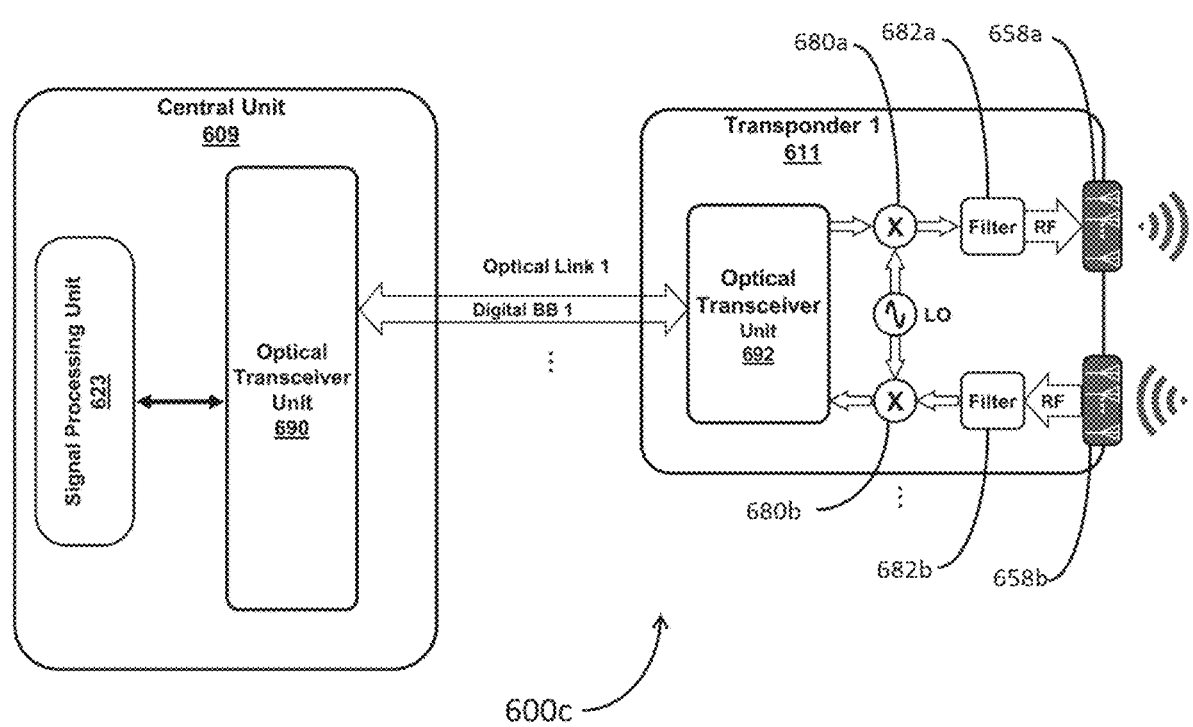
FIG. 6C illustrates a centralized object detection sensor network system having a central unit coupled to a plurality transponders each comprising an optical transceiver connected to the central unit through a bidirectional optical communication link.

FIG. 6C illustrates an example implementation of the centralized object detection sensor network system 300b described above. In certain embodiments, the centralized object detection sensor network system 600c can include one or more features of the embodiments previously described with respect to the centralized object detection sensor network systems 300b (FIG. 3B), 300c (FIG. 3C), 600a (FIG. 6A) and 600b (FIG. 6B) described above, the details of which may be omitted herein for brevity.

The centralized object detection sensor network system 600c may comprise a central unit 609 coupled to a plurality transponders through a plurality of links where each link is an optical communication link. In this example, central unit 609 includes a signal processing unit 623 that generates a plurality of baseband signals (digital or analog) comprising of a plurality baseband signal groups where each baseband signal group is generated for a transponder of the object detection sensor network system 600c. The optical transceiver unit 690 may be configured to receive and convert the plurality of baseband signals to a plurality of multiplexed optical probing signals where each multiplexed optical probing signal comprises a group of baseband signals generated for a transponder. The plurality of the multiplexed optical probing signals may be transmitted via a plurality of optical links to a plurality of the transponders where each optical link is connected to one transponder. For example, a first optical link may deliver a first multiplexed optical signal to a first transponder 611. Each transponder (e.g., the first transponder 611) may include an optical transceiver unit (e.g., optical transceiver unit 692) that receives a multiplexed optical probing signal, comprising a group of baseband signals associated with the transponder (e.g., transponder 611), and generates a plurality of electronic probing signals. In some cases, the plurality of electronic probing signals may be IF signals or baseband signals. The plurality of electronic probing signals may be upconverted to a plurality of RF probing signal using a mixer 680a, an LO and a filter 682a. An antenna unit of the transponder (e.g., antenna unit 658a) may use the plurality of RF probing signals to generate a plurality of free space probing waves and the corresponding plurality of RF echo signals (electronic signals). The plurality of RF echo signals may be downconverted to a plurality or electronic echo signals (e.g., each using a filter 682b, an LO, and a mixer 680b) and sent to the optical transceiver 692. The optical transceiver 692 may use the plurality of electronic echo signals to generate a multiplexed optical echo signal and transmit it to the central unit 609 via the same optical link from which the multiplexed probing signal is received. In some examples, the RF echo signals may be generated by a separate antenna unit (e.g., antenna unit 658b).

The optical transceiver unit 690 receives a plurality of multiplexed optical echo signals (each from a transponder) and generates a plurality of a reflected baseband signals (electronic signals). The plurality of reflected baseband signals may comprise a one or more echo signal groups where each echo signal group corresponds to a multiplexed optical echo signal received from a transponder. The optical transceiver unit 690 transmits the plurality of reflected baseband signals (digital or analog signals) to signal processing unit 623 where they are used to extract information pertaining the position and/or velocity of one or more objects in an environment monitored by the centralized object detection sensor network system 600*c*.

In some embodiments, the optical transceiver unit 690 or 692 may include: one or more of lasers, photoreceivers, optical multiplexers and optical demultiplexers. In some embodiments, the optical transceiver unit 690 may also include a plurality of digital to analog converters.

Figure 7:
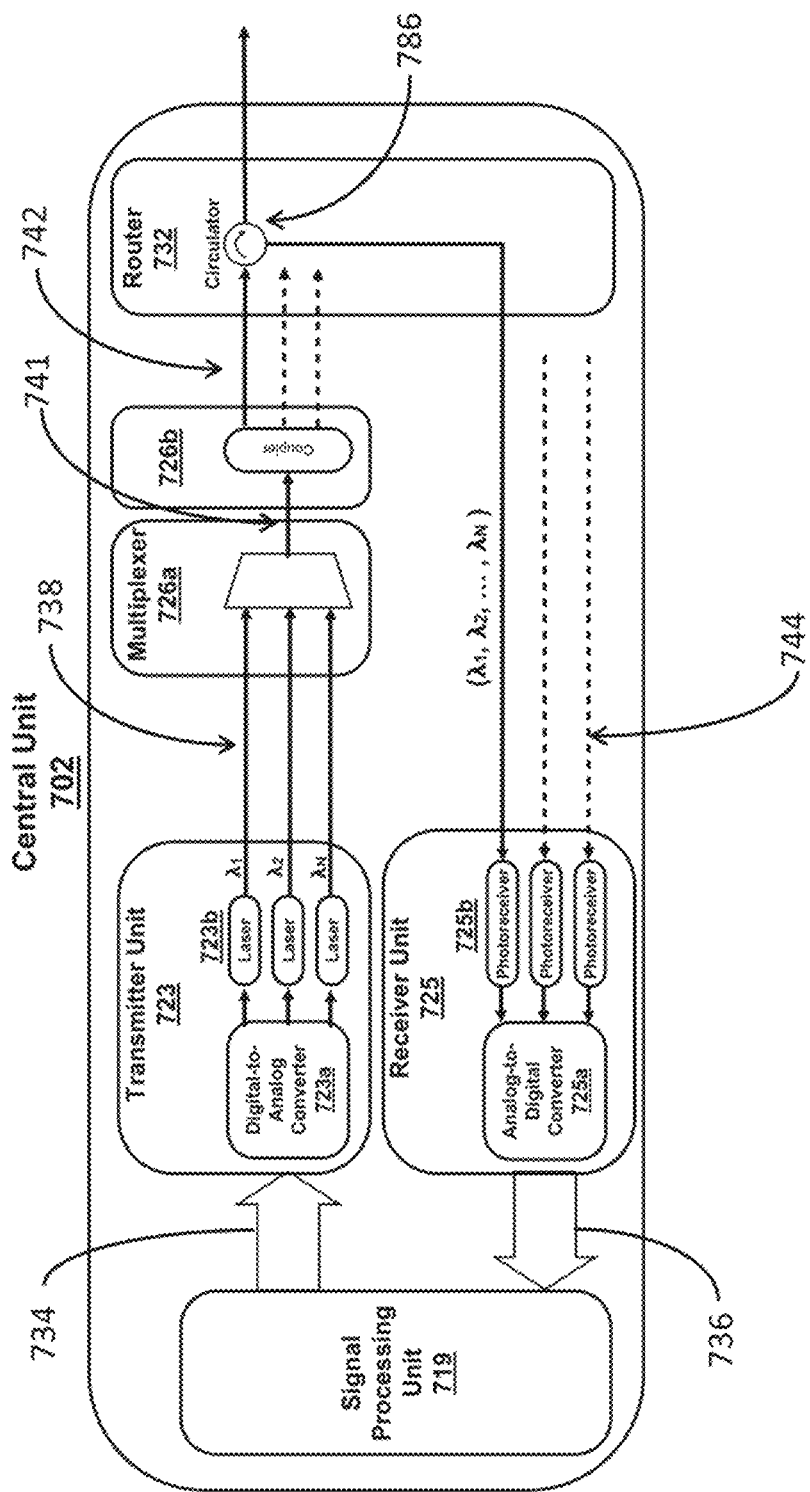
FIG. 7 illustrates a central unit of a centralized object detection sensor network system configured to generate a plurality of multiplexed optical signals using wavelength division multiplexing.

FIG. 7 illustrates an example implementation of the central unit 303 used in the centralized object detection sensor network system 300*c* described above with respect to FIG. 3C. In certain embodiments, the central unit 703 can include one or more features of the embodiments previously described with respect to the central units 302 (FIG. 3B) and 303 (FIG. 3C) described above.

In this example, the central unit 703 includes a signal processing unit 719 that generates a plurality of digital baseband signals 734 and sends them to a transmitter unit 723. The transmitter unit 723 may convert the plurality of digital baseband signals 734 to a plurality of analog baseband signals (analog electronic signals) and subsequently convert them to a plurality of analog optical signals. In the example shown, three digital baseband signals are received by a digital-to-analog converter 723*a* in the transmitter unit 723. The digital-to-analog converter 723 converts these signals to three analog baseband signals and feeds them to three lasers 723*b* having three different wavelengths ($\lambda_1$, $\lambda_2$, and $\lambda_3$). Each analog baseband signal may directly modulate a laser (e.g., an amplitude or phase of the laser output) and generate three optical probing signals 738 each having a different optical wavelength. Each optical probing signal may comprise an optical signal whose phase or amplitude is modulates by one of the analog baseband signals generated by the digital-to-analog converter 723*a*. The optical probing signals 738 may be transmitted to an optical multiplexer 726*a* (intra-transponder multiplexer) that combines them as one multiplexed optical signal 741. An optical splitter (or optical power divider may) may receive the optical probing signal and generate a plurality of secondary multiplexed optical probing signals 742 where each secondary optical probing signal is a copy of the multiplexed optical signal received by the coupler 726*b*. The number of secondary multiplexed optical probing signals may equal to the number of transponders fed by the central unit 702. The plurality of secondary multiplexed optical probing signals 742 are transmitted to a router unit 732 where each secondary multiplexed optical probing signal is received by a plurality of circulators and are coupled to the links 106 (optical links) that are connected to the transponders 104 fed by the central unit 702. For example, a first secondary multiplexed optical probing signal may be coupled to a first transponder by the circulator 786 to a first link. The first transponder may be a transponder in the centralized object detection sensor network system 300*c*. The first transponder may include one or more of the embodiments previously described with respect to the transponder 504 described above with respect to FIG. 5.

The first transponder may receive the first secondary multiplexed optical probing signal and generate three echo signals (electronic signals) each corresponding to one of the analog baseband signals generated by the digital-to-analog converter 723. In some examples, each echo signal may comprise a reflected baseband signal carried by an intermediate frequency (IF) carrier (e.g., amplitude or phase of the IF carrier may be modulated by the echo signal). The frequency of the IF carrier may be different for each echo signal, for example, three IF carriers having frequencies IF1, IF2 and IF3), and each may be modulated by one of the three reflected baseband signal. In some examples, the first transponder may convert the echo signals to optical echo signals (e.g., using the E/O converter 562 (FIG. 5)) and multiplex them as a single multiplexed optical echo signal (e.g., using the intra-transponder multiplexer 564 and based on wavelength multiplexing). In some examples, the first multiplexed optical echo signal may be generated using the wavelengths used for generating the corresponding multiplexed optical signal 741 by the transmitter unit 723. The first multiplexed optical echo signal is then transmitted to the central unit 702 via the first optical link. The circulator 786 couples the first multiplexed optical echo signal to a receiver unit 725 of the central unit 702. In some embodiments, the central unit 702 may not include an intra-transponder demultiplexer unit (unlike the central unit 303 (FIG. 3C)). In some such embodiments, the receiver unit 725, may include a plurality of photoreceivers 725*b* each configured to receive a multiplexed optical echo signal from the router 732 and convert it to a plurality of reflected baseband signals (electronic signals). The photoreceiver may first convert the multiplexed optical echo signal to a multiplexed electronic echo signal. The multiplexed electronic signal may comprise a plurality of IF carriers each modulated by one of the plurality of reflected baseband signals. The photoreceiver may further include electronic components and circuitry to generate the plurality of reflected baseband signals (individual signals) using the multiplexed electronic signal.

In the example shown, a first photoreceiver may receive the first multiplexed optical echo signal and generate three reflected baseband signals (electronic signals) corresponding to the three baseband signals used to generate the three optical probing signals 738. The photoreceiver may comprise a first photodetector, an electronic frequency demultiplexer, and three down-converters. The photodetector is configured to convert the first multiplexed optical echo signal to a multiplexed electronic signal comprising three IF carriers, IF1, IF2, and IF3 each modulated (e.g., amplitude of phase modulated) by one of the three reflected baseband signals. The electronic demultiplexer may be configured to generate three IF signals each comprising one of the IF carriers modulated by one of the reflected basebands. Subsequently, the three down-converters each generate one reflected baseband signal (e.g., by mixing the IF signal with the corresponding IF carrier).

The centralized sensor network systems described above can be different embodiments of a centralized sensor network system for detecting object using radio waves. As such, the free space probing waves and free space echo waves discussed above may comprise radio waves having frequencies between 1 MHz to 100 GHz. In some embodiments, some of the features, devices, links, units, components, methods and processes described with respect to sensor network systems 300*a* (FIG. 3A) and 300*b* (FIG. 3B) may be used to detecting objects using light waves.

Figure 8:
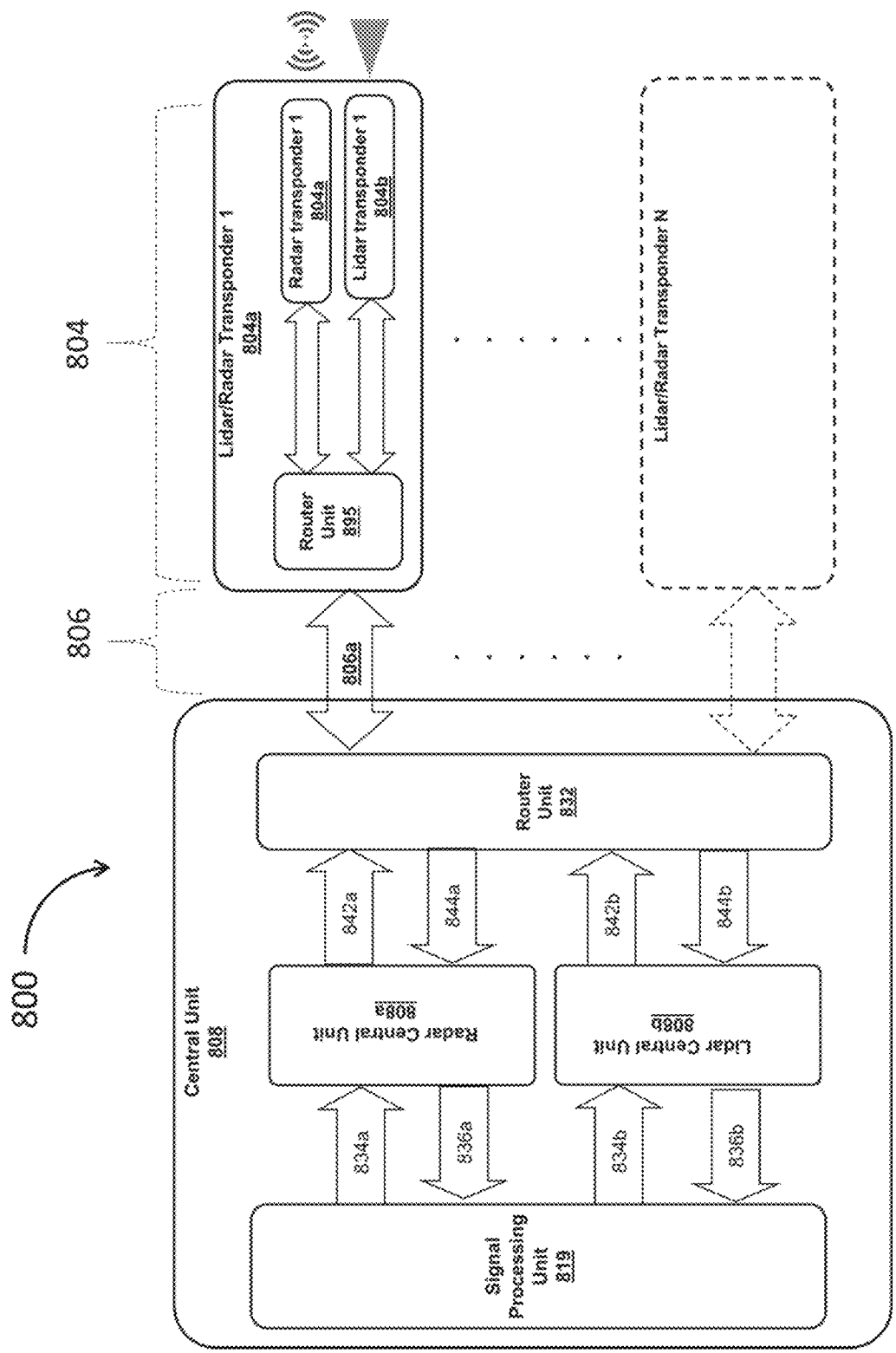
FIG. 8 illustrates another example of a centralized sensor network system. The illustrated system advantageously integrates lidar and radar sensing subsystems. The illustrated lidar-radar sensing subsystem and the lidar and radar sensing subsystem are integrated into a single centralized sensing system.

FIG. 8 illustrates another example of a centralized sensor network system 800. The illustrated system integrates lidar and radar sensing subsystems in a centralized system where certain units are shared between the two subsystems. Advantageously, the illustrated centralized lidar-radar sensing system allows multi-modal (e.g., based on optical and radio frequency waves) detection and ranging using one central unit 808 and a plurality of hybrid transponders (e.g., lidar-radar transponders configured to generate and detect both light wave and radio waves). The centralized object detection sensor network system 800 can include one or more features of embodiments previously described with respect to various centralized object detection sensor network systems described above, the details of which may not be repeated herein for brevity.

The illustrated centralized sensor network system 800 uses a single central unit 808 connected to a one or more lidar-radar transponders 804 through a plurality of communication links 806 (herein referred to as link). The central unit 808 may be configured to generate and process probing signals configured for detection of objects based on free space light waves, herein referred to as lidar probing signals, and probing signals configured for detection of objects based on radio waves, herein referred to as radar probing signals. In some embodiments, a portion of the links can be optical communication links and the rest can be electronic or RF communication links. Each lidar-radar transponder may be connected to the central unit 808 via one or more links. In some cases, the links connecting a lidar-radar transponder to the central unit may comprise both RF/electronic and optical communication links. The central unit 808 transmits one or more radar probing signals and one or more lidar probing signals to each lidar-radar transponder and receives a one or more radar echo signals and one or more lidar echo signals from each lidar-radar transponder. In some embodiments, the lidar or radar probing signals and the lidar or radar echo signals associated with a lidar-radar transponder may be transmitted and received via a single link. In some other embodiments, each lidar-radar transponder may be connected to the central unit 800 via a single link used for transmitting all probing signals and echo signals associated the lidar-radar transponder.

The central unit 808 includes a signal processing unit 819 comprising a signal processing unit 808 (shared between lidar and radar subsystems), a radar central unit 808*a*, a lidar central unit 808*b* and a router unit 832. The signal processing unit 819 generates a plurality of radar baseband signals 834*a* and a plurality of lidar baseband signals 834*b*. The plurality of radar baseband signals 834*a* may be transmitted to a radar central unit 808*a* and the plurality of the plurality of lidar baseband signals 834*b* may be transmitted to a lidar central unit 808*b*. The plurality of the radar baseband signals may comprise the plurality of baseband signals described above.

The router unit 832 is configured to couple the radar or lidar probing signals from the radar central unit 808*a* or lidar central unit 808*b* to the plurality of links 806, and couple the radar or lidar echo signals the one or more lidar-radar transponders 804 received from the plurality of links 806, to the radar central unit 808*a* or the lidar central unit 808*b*. The router may include one or more optical or RF/electronic routers.

The radar central unit 808*a* may be configured to use the plurality of the radar baseband signals to generate one or more radar probing signals 842*a* and transmit them or the router unit 832. In some embodiments, the radar central unit 808*a* may comprise one or more units included in the central unit 302 (FIG. 3B) or the central unit 303 (FIG. 3C).

In some cases, one or more radar probing signals may comprise one or more multiplexed radar probing signals (e.g., each comprising a plurality of radar probing signals multiplexed as one signal). The router 832 couples the radar probing signals associated with a lidar-radar transponder through a link connected to the lidar-radar transponder, for example, a first link 806*a* connected to a first lidar-radar transponder 804*a* of the plurality of lidar-radar transponders shown in centralized sensor network system 800. In some examples, the link 806*a* may be a bidirectional link. In some examples, the link 805*a* may comprise two or more links (e.g., one or more links for communicating radar signals and one or more links for communicating lidar signals).

The transponder 804 may comprise a router unit 895, a radar transponder 804*a*, and a lidar transponder 804*b*. The router 895 couples the radar probing signals received from the link 806*a* to the radar transponder 804*a* and couples back one or more radar echo signals generated by the radar transponder 804*a* to the link 806*a*. The radar transponder may convert the one or more radar probing signals to one or more free space radar probing waves, direct them to an environment and convert one or more free space radar echo waves to one or more radar echo signals. The free space radar echo waves may be reflections of one or more free space radar probing waves by one or more objects in an environment probed by the transponder 804*a*.

In some examples, the one or more radar echo signals may comprise one or more multiplexed radar echo signals. The router 832 may couple the radar echo signals 844*a* received from the link 806*a* to the radar central unit 808*a*. The radar central unit 808*a* may use the radar echo signal 844*a* to generate one or more reflected baseband signals 836*a* and send them to the signal processing unit 819. The signal processing unit 819 may use the one or more baseband signals 834*a* and the one or more reflected basedband signals 836*a* to determine positions and/or velocities of the one or more objects. In some examples, the signal processing unit 819 may use the one or more baseband signals 834*a* and the one or more reflected basedband signals 836*a* to generate one or more radar object signals usable for determining velocities and locations of the one or more objects.

The lidar central unit 808*b* may be configured to use the plurality of the lidar baseband signals to generate one or more lidar probing signals 842*b* and transmit them or the router unit 832. In some embodiments the lidar central unit 808*b* may comprise one or more units included in the central unit 302 (FIG. 3B) or central unit 303 (FIG. 3C).

In some cases, one or more lidar probing signals may comprise one or more multiplexed lidar probing signals (e.g., each comprising a plurality of lidar probing signals multiplexed as one signal). The router 832 couples the lidar probing signals associated with a lidar-radar transponder through a link connected to the lidar-radar transponder, for example, a first link 806*a* connected to a first lidar-radar transponder 804*a* of the plurality of lidar-radar transponders shown in centralized sensor network system 800. In some examples, the link 806*a* may be a bidirectional link. In some examples, the link 805*a* may comprise two or more links (e.g., one or more links for communicating radar signals and one or more links for communicating lidar signals).

The router 895 in the first lidar-radar transponder 804*b* couples the lidar probing signals received from the link 806*a* to the lidar transponder 804*b* and couples back one or more lidar echo signals generated by the lidar transponder 804*b* to the link 806*a*. The lidar transponder 804*b* may convert the one or more lidar probing signals to one or more free space lidar probing waves (light waves), direct them to an environment and convert one or more free space lidar echo waves (reflected light waves) to one or more lidar echo signals. The free space lidar echo waves may be reflections of one or more free space lidar probing waves by one or more objects in the environment probed by the transponder 804*b*.

In some examples, the one or more lidar echo signals may comprise one or more multiplexed radar echo signals. The router 832 may couple the lidar echo signals 844*b* received from the link 806*a* to the lidar central unit 808*b*. The lidar central unit 808*b* may use the lidar echo signal 844*b* to generate one or more reflected lidar baseband signals 836*b* and send them to the signal processing unit 819. The signal processing unit 819 may use the one or more lidar baseband signals 834*b* and the one or more reflected lidar basedband signals 836*b* to determine positions and/or velocities of the one or more objects. In some examples, the signal processing unit 819 may use the one or more lidar baseband signals 834*b* and the one or more reflected lidar basedband signals 836*b* to generate one or more lidar object signals usable for determining velocities and locations of the one or more objects.

In some embodiments, the central unit 819 may use a combination of the radar baseband signals, the reflected radar baseband signals, the lidar baseband signals and the reflected lidar baseband signals to determine positions and/or velocities of the one or more objects or to generate one or more hybrid object signals usable for determining velocities and locations of the one or more objects. Advantageously, in these embodiments, the positions and/or velocities of the one or more objects can be determined with higher resolution and more accuracy. In addition, hybrid object signals may be used to extract certain information related to the one or more objects or the environment that may not be extractable from radar object signals or lidar object signals separately.

In various embodiments, the central unit may determine the velocities and the positions of one or more objects based at least in part on one or more reflected baseband signals generated using one or more echo signals received from the one or more transponders. In some cases, the central unit may determine the velocities and the positions of the one or more objects based at least in part on one or more reflected baseband signals generated using one or more echo signals received from the one or more transponders and one or more base band signals associated with the reflected baseband signals. In some other cases, the central unit may determine the velocities and/or the positions of the one or more objects based at least in part on one or more reflected baseband signals generated using one or more echo signals received from the one or more transponders and one or more parameter values associated with one or more signal generators that generate the one or more baseband signals associated with the reflected baseband signals.

The central unit may determine the velocities of the one or more objects with respect to a reference frame. For example, the reference frame may be a rest frame of the transponders used to detect the objects (e.g., by sending probing signals and receiving echo signals). The rest frame of the transponders may a reference frame in which the coordinate of the transponders do not change over time.

Figure 9:
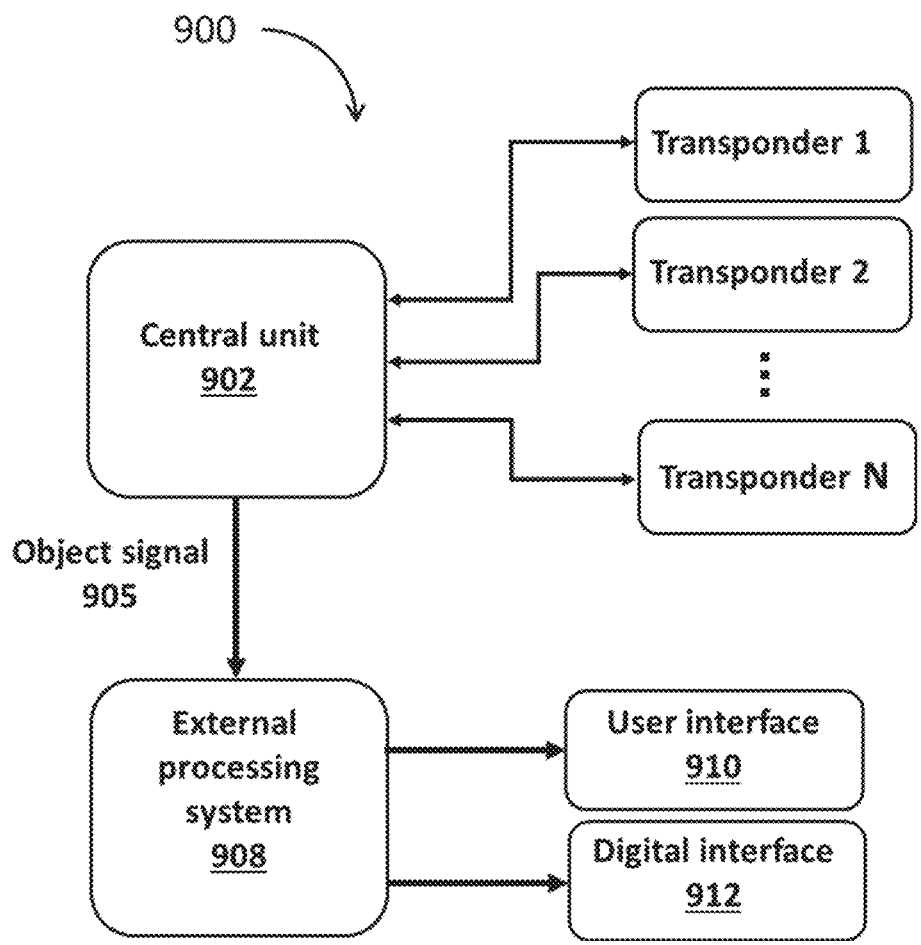
FIG. 9 illustrates an example centralized sensor network system that generates an object signal and transmits the object signal to an external processing system.

As described above, in various embodiments a central unit of a centralized sensor network system may generate an object signal based at least in part on one or more reflected baseband signals generated using the one or more echo signals received from the plurality of transponders of the centralized sensor network system. FIG. 9 illustrates an example centralized sensor network systems with a central unit 902 that generates an object signal 905. The central unit 902 may transmit the object signal 907 to an external processing system 908. The external processing system 908 may use the object signal 905 to determine the velocities and/or positions of the one or more objects detected by the centralized sensor network system 900. The velocities and/or positions may be determined with respect to the one or more transponders used to detect the one or more objects. The external processing system 908 may include one or more memories, one or more processors. The one or more processors may be configured to determine the velocities and the positions of the one or more objects by executing machine readable instructions stored in the one or more memories. The external processing system may transmit determined velocities and/or positions of the one or more objects to a user interface 910 or a digital interface 912. The user interface 910 may be configured to display the determined velocities and the positions along with other information related to the detection of the one or more objects (e.g., location of the transponders, uncertainties associated with the determination process, information about probing signals and free space probing wave used to detect the one or more objects and the like). The digital interface 912 may be configured to transmit the determined velocities and/or positions and other information related to the detection of the one or more objects, to one or more electronic devices (e.g., the electronic devices: of an automobile, an airplane, a factory, a user, and the like).

In some examples, the object signal may carry data (e.g., raw data) extracted from one or more reflected baseband signals by a signal processing unit of the central unit. The extracted data may be raw data, compressed raw data or processed raw data (e.g., processed by the signal processing unit of the central unit). In some cases, compressed raw data may comprise the information usable for determining velocities or positions of one or more detected objects but may be smaller compared to raw data and require less bandwidth to be transmitted to the processing system 908 within a given time interval. In some cases, the processed raw data comprises the same information as raw data and can be used to determine the velocities and/or positions of the one or more object detected by the centralized sensor network systems. In some examples, the external processing system 908 may need less computational power or resources to determine the velocities and/or positions of the one or more objects using an object signal comprising processed raw data as compared to using an object signal comprising raw data or compressed raw data.

In some examples, the object signal may additionally carry data associated with the baseband signals used to generate the reflected baseband signals. In yet other examples, the object signal may carry data associated with algorithms, signal generators and/or parameter values used by the signal processing unit of the central unit to generate the one or more baseband signals.

In some cases, the object signal may be a multiplexed signal generated by a plurality of signals each usable for determining the velocity or positions of one object of the plurality of objects detected by the centralized sensor network system.

Example Applications

Figure 10:
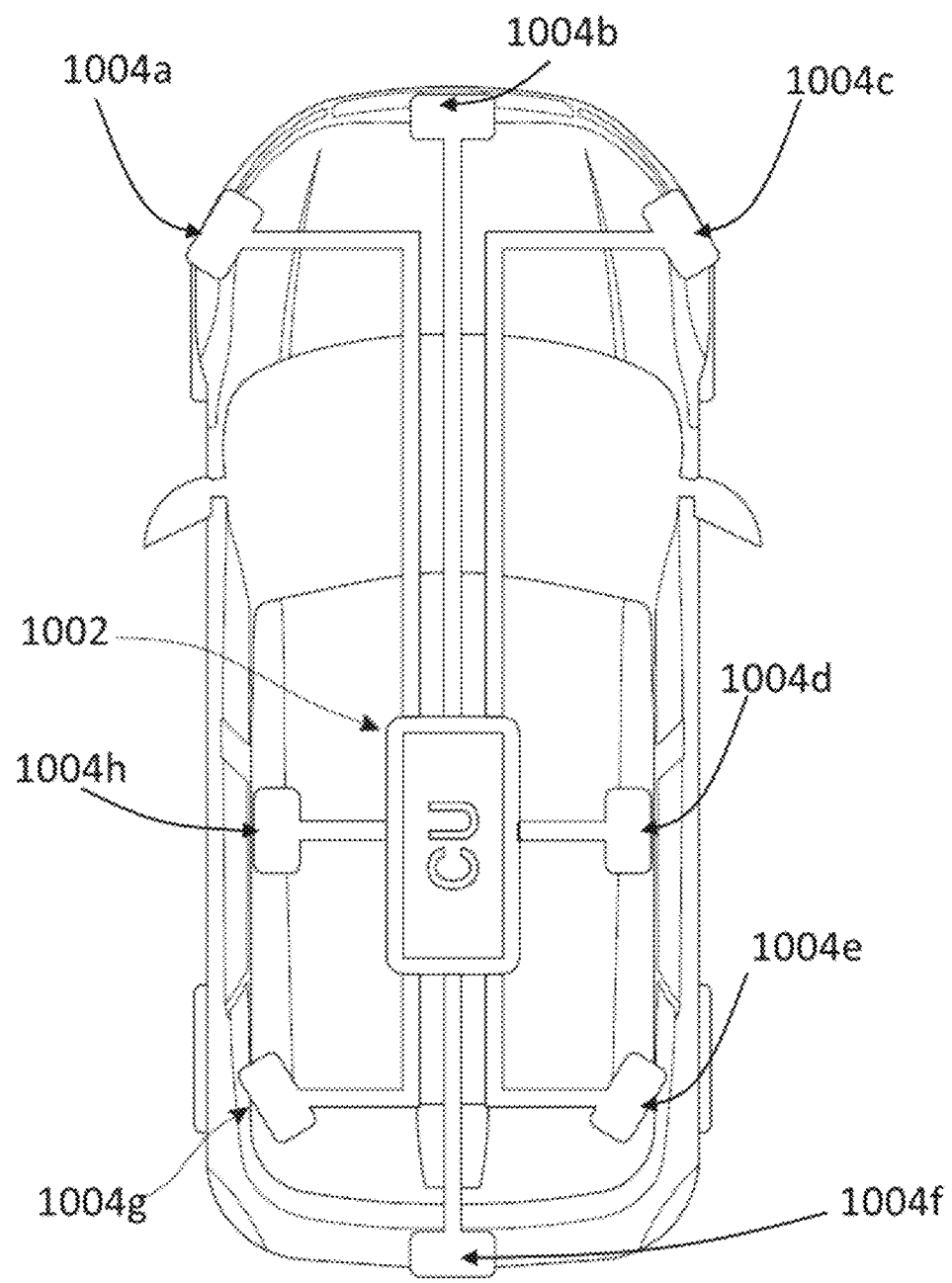
FIG. 10 illustrates an example application of a centralized sensor network system where the system is used to monitor the environment surrounding an automobile.

In some embodiments, one or more of the centralized sensor network systems described above can be used to monitor the position and/or the velocities of one or more objects in an environment surrounding an automobile. FIG. 10 shows a centralized sensor network system (e.g., centralized sensor network system 100, 200, 300*b* or 800) used for such application. In this example, the centralized sensor network system a central unit 1002 is communicatively connected to 8 transponders 1004*a*-1004*h* installed at different sites on the automobile, with minimum impact on the vehicle's external envelope. In some examples, one or more of the transponders 1004*a*-1004*h* may be replaced by a sensor (e.g., camera, acoustic sensor, and the like).

In some embodiments, one or more of the centralized sensor network systems described above can be used to monitor the position and/or the velocities of one or more objects in an environment surrounding an aircraft. In such embodiments, a plurality of transponders may be attached to various positions on the aircraft body and enable detecting objects at any arbitrary direction. The one or more centralized sensor network systems may comprise, for example, the centralized sensor network system 100, 200, 300*b* or 800 described above.

In some embodiments, one or more of the centralized sensor network systems described above can be used to monitor an environment, for example, an open (or outdoor) field. The open field can be an airport, a parking lot, a stadium, a city street intersection, an animal farm, a wind turbine field, a sea coastal area. The one or more centralized sensor network systems may comprise, for example, the centralized sensor network system 100, 200, 300*b* or 800 described above.

In some embodiments, one or more of the centralized sensor network systems described above can be used to monitor an indoor environment room, a factory floor, a factory assembly line or conveyor belts, or a warehouse. The one or more centralized sensor network systems may comprise, for example, the centralized sensor network system 100, 200, 201, 300*b* or 800 described above.

Additional Examples

Group-I
1. A centralized object detection sensor network system for detecting one or more objects in an environment, comprising:
    a central unit configured to:
        generate one or more baseband signals,
        generate one or more probing signals using the one or more baseband signals and transmit the one or more probing signals to one or more transponders,
        receive one or more echo signals from the one or more transponders, and
        detect the one or more objects the using one or more baseband signals and the one or more echo signals,
    wherein the one or more transponders are physically separate from the central unit while being communicatively coupled thereto through one or more communication links, and wherein the one or more transponders are configured to:
        receive the one or more probing signals from the central unit through the one or more communication links,
        generate one or more radio frequency (RF) probing signals using the one or more probing signals and an RF carrier signal,
        convert the one or more RF probing signals into free space probing waves,
        direct the free space probing waves to the environment for detecting the one or more objects,
        receive one or more free space echo waves from the one or more objects, and
        generate the one or more echo signals using the free space echo waves and transmit to the one or more echo signals to the central unit through the one or more communication links.
2. The sensor network system of the above Embodiment, wherein the sensor network system comprises a plurality of transponders coupled to the central unit and wherein the central unit serves as a common central unit for detecting the one or more objects based on the one or more echo signals generated by the plurality of transponders.
3. The sensor network system of any of the above Embodiments, wherein the sensor network system is configured to detect the one or more objects using one or more sensing modalities, wherein different ones of the transponders are configured for same or different sensing modalities.
4. The sensor network system of any of the above Embodiments, wherein the one or more modalities include at least radar sensing.
5. The sensor network system of any of the above Embodiments, wherein the one or more modalities include one or more of radar sensing, lidar sensing, imaging, kinematic sensing and position sensing.
6. The sensor network system of any of the above Embodiments, wherein the central unit and the one or more transponders are physically separated by a distance of about a centimeter to a kilometer.
7. The sensor network system of any of the above Embodiments, wherein detecting the one of more objects comprises determining distances between the one or more transponders and the one or more objects.
8. The sensor network system of any of the above Embodiments, wherein detecting the one of more objects comprises determining velocities of the one or more objects with respect to the one or more transponders.
9. The sensor network system of any of the above Embodiments, wherein the central unit comprises:
    a signal processing unit configured to generate the one or more baseband signals;
    a transmitter coupled to the signal processing unit and configured to receive the one or more baseband signals from the signal processing unit to generate the one or more probing signals; and
    a receiver coupled to the signal processing unit and configured to receive the one or more echo signals to generate one or more reflected baseband signals and feed the one or more reflected baseband signals to the signal processing unit.
10. The sensor network system of any of the above Embodiments, wherein the central unit comprises a router configured to couple the one or more probing signals to the one or more communication links, and to couple the one or more echo signals, received from the one or more communication links, to the receiver.
11. The sensor network system of any of the above Embodiments, wherein the one or more transponders generate the one or more echo signals by downconverting one or more RF echo signals.
12. The sensor network system of any one of any of the above Embodiments, wherein the one or more probing signals comprise one or more baseband signals and the one or more echo signals comprise one or more reflected baseband signals.
13. The sensor network system of any of the above Embodiments, wherein the one or more probing signals comprise one or more intermediate frequency (IF) signals comprising intermediate frequency carriers modulated by baseband signals, the one or more echo signals comprise one or more intermediate frequency (IF) signals comprising intermediate frequency carriers modulated by reflect baseband signals.

14. The sensor network system of any of the above Embodiments, wherein the one or more probing signals comprise a baseband signal and the one or more echo signals comprise one or more IF signals comprising intermediate frequency carriers modulated by one or more baseband signals.
15. The sensor network system of any of the above Embodiments, wherein the one or more probing signals comprise one or more multiplexed probing signals and the one or more echo signals comprise one or more multiplexed echo signals.
16. The sensor network system of any of the above Embodiments, wherein the one or more probing signals and/or the one or more echo signals comprise digital signals.
17. The sensor network system of any of the above Embodiments, wherein at least one of the probing signals comprise an optical probing signal comprising an optical carrier modulated by the probing signal.
18. The sensor network system of any of the above Embodiments, wherein the at least one of the one or more echo signals comprise an optical echo signal comprising an optical carrier modulated by the echo signal.
19. The sensor network system of any of the above Embodiments, wherein the central unit comprises one or more electrical-to-optical converters configured to convert electrical probing signals to one or more optical probing signals and one or more electrical-to-optical converters configured to convert one or more optical echo signals to electrical echo signals.
20. The sensor network system of any of the above Embodiments, wherein at least one of the one or more transponders comprises: one or more electrical-to-optical converters configured to convert electrical probing signals to the one or more optical probing signals, and one or more electrical-to-optical converters configured to convert the one or more optical echo signals to electrical echo signals.
21. The sensor network system of any of the above Embodiments, wherein the one or more multiplexed probing signals and/or the one or more multiplexed echo signals are wavelength multiplexed signals.
22. The sensor network system of any of the above Embodiments, wherein at least one communication link comprises an electrical link or a RF link.
23. The sensor network system of any of the above Embodiments, wherein at least one communication link comprises an optical link.
24. The sensor network system of any of the above Embodiments, wherein at least one transponder comprises an antenna unit, wherein the antenna unit comprises one or more RF antennas or optical antennas.
25. The sensor network system of any of the above Embodiments, wherein at least one free space probing wave and at least one free space echo wave are free space radio waves.
26. The sensor network system of any of the above Embodiments, wherein at least one free space probing wave and at least one free space echo wave are free space light waves.
27. The sensor network system of any of the above Embodiments, wherein the antenna unit comprises at least one optical antenna configured to generate and/or receive light waves.
28. The sensor network system of any of the above Embodiments, wherein the central unit comprises a radar central unit configured for detecting the one or more objects by radar sensing and a lidar central unit configured for detecting the one or more objects by lidar sensing.
29. The sensor network system of any of the above Embodiments, wherein the radar central unit and the lidar central unit share one or more of a common signal procession unit, a common router, and common links between the central unit and the one or more transponders.
30. The sensor network system of any of the above Embodiments, wherein the probing signals and the echo signals are communicated between a transponder of the one or more transponders and the central unit via a bidirectional communication link.
31. The sensor network system of any of the above Embodiments, wherein the one or more probing signals and the one or more echo signals are communicated between a transponder of the one or more transponders and the central unit via a two separate communication links.
32. The sensor network system of any of the above Embodiments, wherein the signal processing unit comprises at least a digital signal processing unit.
33. The sensor network system of any of the above Embodiments, wherein the central unit comprises one or more digital-to-analog converters and analog-to-digital converters.
34. The sensor network system of any of the above Embodiments, wherein the central unit is configured to use the one or more probing signals and one or more echo signals to generate an object signal usable for determining distances between the one or more transponders and the one or more objects, and/or for determining velocities of the one or more objects with respect to the one or more transponders.
35. The sensor network system of any of the above Embodiments, wherein the sensor network system is installed as part of an autonomous vehicle.
36. The sensor network system of any of the above Embodiments, wherein the free space probing waves are continuous waves.

Group II

1. A centralized object detection sensor network system for detecting one or more objects in an environment, comprising:
    a central unit configured to:
        generate one or more baseband signals,
        generate one or more probing signals using the one or more baseband signals and transmit the one or more probing signals to one or more transponders,
        receive one or more echo signals from the one or more transponders, and
        detect the one or more objects the using the one or more baseband signals and the one or more echo signals,
    wherein the one or more transponders are physically separate from the central unit while being communicatively coupled thereto through one or more communication links, and
    wherein the one or more transponders are configured to:
        receive the one or more probing signals from the central unit through the one or more communication links and generate free space probing waves therefrom, direct the free space probing waves to the environment for detecting the one or more objects,
receive one or more free space echo waves from the one or more objects, and
generate the one or more echo signals using the free space echo waves and transmit the one or more echo signals to the central unit through the one or more communication links.

2. The sensor network system of the above Embodiment, wherein the central unit comprises:
a signal processing unit configured to generate the one or more baseband signals;
a transmitter coupled to the signal processing unit and configured to receive the one or more baseband signals from the signal processing unit to generate the one or more probing signals; and
a receiver coupled to the signal processing unit and configured to receive the one or more echo signals to generate one or more reflected baseband signals and feed the one or more reflected baseband signals to the signal processing unit.

3. The sensor network system of any of the above Embodiments, wherein the central unit comprises a router configured to couple the one or more probing signals to the one or more communication links, and to couple the one or more echo signals, received from the one or more communication links, to the receiver.

4. The sensor network system of any one of the above Embodiments, wherein the one or more probing signals comprise the one or more baseband signals and the one or more echo signals comprise the one or more reflected baseband signals.

5. The sensor network system of any of the above Embodiments, wherein the one or more probing signals comprise one or more intermediate frequency (IF) signals comprising intermediate frequency carriers modulated by the one or more baseband signals, and the one or more echo signals comprise one or more intermediate frequency (IF) signals comprising intermediate frequency carriers modulated by the one or more reflected baseband signals.

6. The sensor network system of any of the above Embodiments, wherein the one or more probing signals comprise the one or more baseband signals and the one or more echo signals comprise one or more IF signals comprising intermediate frequency carriers modulated by the one or more reflected baseband signals.

7. The sensor network system of any of the above Embodiments, wherein at least one of the one or more probing signals comprises an optical probing signal comprising an optical carrier modulated by one of the probing signals.

8. The sensor network system of any of the above Embodiments, wherein at least one of the one or more echo signals comprises an optical echo signal comprising an optical carrier modulated by one of the echo signals.

9. The sensor network system of any one of the above Embodiments, wherein the central unit comprises one or more electrical-to-optical converters configured to convert electrical probing signals to one or more optical probing signals and one or more electrical-to-optical converters configured to convert one or more optical echo signals to electrical echo signals.

10. The sensor network system of any one of the above Embodiments, wherein at least one of the one or more transponders comprises: one or more electrical-to-optical converters configured to convert electrical probing signals to the one or more optical probing signals, and one or more electrical-to-optical converters configured to convert the one or more optical echo signals to electrical echo signals.

11. The sensor network system of any one of the above Embodiments, wherein the sensor network system comprises a plurality of transponders coupled to the central unit, and wherein the central unit serves as a common central unit for detecting the one or more objects based on the one or more echo signals generated by the plurality of transponders.

12. The sensor network system of any one of the above Embodiments, wherein at least one communication link comprises an electrical link or a RF link.

13. The sensor network system of any one of the above Embodiments, wherein at least one communication link comprises an optical link.

14. The sensor network system of any one of the above Embodiments, wherein at least one free space probing wave and at least one free space echo wave are free space radio waves.

15. The sensor network system of any one of the above Embodiments, wherein the probing signals and the echo signals are communicated between a transponder of the one or more transponders and the central unit via a bidirectional communication link.

16. The sensor network system of any one of the above Embodiments, wherein the one or more probing signals and the one or more echo signals are communicated between a transponder of the one or more transponders and the central unit via a two separate communication links.

17. The sensor network system of any one of the above Embodiments, wherein the central unit is configured to detect the one of more objects at least in part by determining distances between the one or more transponders and the one or more objects.

18. The sensor network system of any one of the above Embodiments, wherein the central unit is configured to detect the one of more objects at least in part by determining velocities of the one or more objects with respect to the one or more transponders.

19. The sensor network system of any one of any of the above Embodiments wherein the sensor network system comprises a plurality of transponders coupled to the central unit, and wherein the transponders may comprise on or more digital signal processing unit to generate an object signal usable for determining distances between the one or more transponders and the one or more objects, and/or for determining velocities of the one or more objects with respect to the one or more transponders.

Group III

1. A centralized object detection sensor network system for detecting one or more objects in an environment, comprising:
a central unit communicatively coupled to one or more transponders through one or more communication links, wherein the one or more transponders are physically separate from the central unit,
wherein the central unit is configured to:
generate one or more multiplexed probing signals and transmit at least a multiplexed probing signal of the one or more multiplexed probing signals to a transponder of the one or more transponders, receive a multiplexed echo signal from the transponder, and detect the one or more objects using one or more reflected baseband signals, wherein the baseband signals are generated using the multiplexed echo signal, and wherein the transponder is configured to:

receive the multiplexed probing signal from the central unit through a communication link of the one or more communication links, generate one or more radio frequency (RF) probing signals using the multiplexed probing signal and one or more RF carrier signals, convert the one or more RF probing signals into free space probing waves, direct the free space probing waves to the environment for detecting the one or more objects, receive one or more free space echo waves from the one or more objects, and generate the multiplexed echo signal using the free space echo waves and transmit to the multiplexed echo signal to the central unit through the communication link.

2. The sensor network system of the above Embodiment, the communication link is a bidirectional communication link.

3. The sensor network system of any of the above Embodiments, wherein the one or more multiplexed probing signals comprise one or more optical probing signals and the one or more multiplexed echo signals comprise one or more optical echo signals.

4. The sensor network system of any of the above Embodiments wherein the one or more multiplexed probing signals and/or the one or more multiplexed echo signals are wavelength multiplexed signals.

5. The sensor network system of any of the above Embodiments, wherein the free space probing waves are continuous waves (CW).

6. The sensor network system of any of the above Embodiments, wherein the central unit comprises one or more digital-to-analog converters and analog-to-digital converters.

7. The sensor network system of any of the above Embodiments, wherein the signal processing unit comprises at least a digital signal processing unit.

8. The sensor network system of any of the above Embodiments, wherein the central unit is configured to use the one or more probing signals and one or more echo signals to generate an object signal usable for determining distances between the one or more transponders and the one or more objects, and/or for determining velocities of the one or more objects with respect to the one or more transponders.

9. The sensor network system of any of the above Embodiments, wherein the sensor network system is configured to detect the one or more objects using one or more sensing modalities, wherein different ones of the transponders are configured for same or different sensing modalities.

10. The sensor network system of any of the above Embodiments, wherein the one or more modalities include one or more of radar sensing, lidar sensing, imaging, kinematic sensing and position sensing.

11. The sensor network system of any of the above Embodiments, wherein the one or more modalities include at least radar sensing.

12. The sensor network system of any of the above Embodiments, wherein the central unit and the one or more transponders are physically separated by a distance between a centimeter to one hundred kilometer.

13. The sensor network system of any of the above Embodiments, wherein the one or more optical probing signals and/or the one or more optical echo signals comprise one or more optical carriers modulated with digital signals.

14. The sensor network system of any one of the Embodiments, wherein the sensor network system is installed as part of an autonomous vehicle.

Group IV

1. A centralized object detection sensor network system for detecting one or more objects in an environment, comprising a central unit communicatively coupled to one or more lidar-radar transponders through one or more communication links, wherein the one or more lidar-radar transponders are physically separate from the central unit, and wherein the central unit is configured to:

generate one or more radar probing signals and one or more lidar probing signals, transmit the one or more radar probing signals and the one or more lidar signals to the one or more lidar-radar transponders, receive one or more radar echo signals and one or more lidar echo signals from the one or more lidar-radar transponders, and detect the one or more objects based at least in part on the one or more radar echo signals and the one or more lidar echo signals.

2. The sensor network system of the above embodiment wherein at least a lidar-radar transponder of the one or more lidar-radar transponders comprises a lidar transponder configured to generate lidar probing waves using a radar transponder configured to generate radar probing waves, where in lidar probing waves comprise light waves and radar probing wave comprise radio waves.

3. The sensor network system of any of the above Embodiments, wherein the at least one lidar-radar transponder comprises an antenna unit, wherein the antenna unit comprises one or more RF antennas and one or more optical antennas configured to send and receive the light waves.

4. The sensor network system of any one of any of the above Embodiments, wherein the central unit comprises a radar central unit configured for detecting the one or more objects by radar sensing and a lidar central unit configured for detecting the one or more objects by lidar sensing.

5. The sensor network system of any of the above Embodiments, wherein the radar central unit and the lidar central unit share one or more of a common signal processing unit, a common router, and common links between the central unit and the one or more transponders.

6. The sensor network system of any of the above Embodiments, wherein the central unit detects the one or more objects by determining distances between the one or more transponders and the one or more objects, and/or velocities of the one or more objects with respect to the one or more transponders or by generating an object signal usable for determining distances between the one or more transponders and the one or more objects, and/or for determining velocities of the one or more objects with respect to the one or more transponders, base at least in part the one or more lidar echo signals and the one or more radar echo signals.

Terminology

It will be appreciated that each of the processes, methods, and algorithms described herein and/or depicted in the figures may be embodied in, and fully or partially automated by, code modules executed by one or more physical computing systems, hardware computer processors, application-specific circuitry, and/or electronic hardware configured to execute specific and particular computer instructions. For example, computing systems may include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some embodiments, particular operations and methods may be performed by circuitry that is specific to a given function.

Further, certain embodiments of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, an input data may include sensor data collected at very short time intervals, with large amounts of data collected at each time interval. As such, a specifically programmed computer hardware may be necessary to process the input data in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. In some embodiments, the non-transitory computer-readable medium may be part of one or more of the local processing and data module, the remote processing module, and remote data repository. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities may be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto may be performed in other sequences that are appropriate, for example, in serial, in parallel, or in some other manner. Tasks or events may be added to or removed from the disclosed example embodiments. Moreover, the separation of various system components in the embodiments described herein is for illustrative purposes and should not be understood as requiring such separation in all embodiments. It should be understood that the described program components, methods, and systems may generally be integrated together in a single computer product or packaged into multiple computer products.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

Indeed, it will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Accordingly, the embodiments are not intended to be limited to the embodiments shown herein, but are to be accorded the widest scope consistent with this disclosure, the principles and the novel features disclosed herein.

What I claim is:

1. A centralized object detection sensor network system for detecting one or more objects in an environment, the sensor network system comprising:
    a central unit coupled to one or more transponders through one or more communication links, the central unit configured to:
       generate one or more baseband signals,
       generate one or more probing signals using the one or more baseband signals and transmit the one or more probing signals to one or more transponders through the one or more communication links,
       receive one or more echo signals from the one or more transponders through the one or more communication links, and
       detect the one or more objects based at least in part on the one or more echo signals and the one or more baseband signals,
    wherein the one or more transponders are physically separate from the central unit while being communicatively coupled thereto through the one or more communication links, and
    wherein the one or more transponders are configured to:
       receive the one or more probing signals from the central unit through the one or more communication links and generate free space probing waves therefrom,
       direct the free space probing waves to the environment for detecting the one or more objects,
       receive one or more free space echo waves from the one or more objects, and
       generate the one or more echo signals using the free space echo waves and transmit the one or more echo signals to the central unit through the one or more communication links.

2. The sensor network system of claim 1, wherein the one or more transponders are further configured to generate the free space probing waves by:
    generating one or more radio frequency (RF) probing signals using the one or more probing signals and one or more RF carrier signals, and
    converting the one or more RF probing signals into the free space probing waves.

3. The sensor network system of claim 1, wherein the central unit comprises:
    a signal processing unit configured to generate the one or more baseband signals;
    a transmitter coupled to the signal processing unit and configured to receive the one or more baseband signals from the signal processing unit to generate the one or more probing signals; and
    a receiver coupled to the signal processing unit and configured to receive the one or more echo signals to generate one or more reflected baseband signals and feed the one or more reflected baseband signals to the signal processing unit.

4. The sensor network system of claim 3, wherein the central unit further comprises a router configured to couple the one or more probing signals to the one or more communication links, and to couple the one or more echo signals, received from the one or more communication links, to the receiver or to a demultiplexer.

5. The sensor network system of claim 3, wherein the one or more probing signals comprise the one or more baseband signals and the one or more echo signals comprise the one or more reflected baseband signals, or wherein the one or more probing signals and the one or more echo signals comprise one or more intermediate frequency (IF) signals, wherein the one or more IF signals comprise intermediate frequency carriers modulated by the one or more baseband signals or by the one or more reflected baseband signals.

6. The sensor network system of claim 3, wherein the one or more probing signals comprise the one or more baseband signals and the one or more echo signals comprise one or more IF signals comprising intermediate frequency carriers modulated by the one or more reflected baseband signals.

7. The sensor network system of claim 3, wherein the one or more probing signals comprise one or more optical probing signals and the central unit further comprises one or more electrical-to-optical converters configured to generate the one or more optical probing signals.

8. The sensor network system of claim 3, wherein the one or more echo signals comprise one or more optical echo signals and the central unit further comprises one or more optical-to-electrical converters configured to convert the one or more optical echo signals to one or more electrical signals and feed them to the receiver.

9. The sensor network system of claim 7, wherein the one or more optical probing signals comprise one or more optical carrier signals modulated by the one or more baseband signals.

10. The sensor network system of claim 1, wherein the one or more communication links comprise one or more electrical links, one or more optical links or one or more RF links.

11. The sensor network system of claim 1, wherein at least one free space probing wave and at least one free space echo wave are free space radio waves.

12. The sensor network system of claim 1, wherein the probing signals and the echo signals are communicated between a transponder of the one or more transponders and the central unit via a bidirectional communication link.

13. The sensor network system of claim 1, wherein the one or more probing signals and the one or more echo signals are communicated between a transponder of the one or more transponders and the central unit via two separate communication links.

14. The sensor network system of claim 1, wherein the central unit is configured to detect the one of more objects at least in part by one or more of:
   determining distances between the one or more transponders and the one or more objects;
   determining velocities of the one or more objects with respect to the one or more transponders;
   generating an object signal usable for determining the distances between the one or more transponders and the one or more objects; and
   generating an object signal usable for determining the velocities of the one or more objects with respect to the one or more transponders.

15. A centralized object detection sensor network system for detecting one or more objects in an environment, the sensor network system comprising:
   a central unit communicatively coupled to one or more transponders through one or more communication links, wherein the one or more transponders are physically separate from the central unit,
   wherein the central unit is configured to:
      generate one or more multiplexed probing signals and transmit at least one of the multiplexed probing signals to one of the transponders through one of the communication links,
      receive a multiplexed echo signal from the one of the transponders through the one of the communication links, and
      detect the one or more objects based at least in part on one or more reflected baseband signals, wherein the one or more reflected baseband signals are generated using the multiplexed echo signal, and
   wherein the one of the transponders is configured to:
      receive the one of the multiplexed probing signals from the central unit through the one of the communication links,
      generate one or more radio frequency (RF) probing signals using the one of the multiplexed probing signals and one or more RF carrier signals,
      convert the one or more RF probing signals into free space probing waves,
      direct the free space probing waves to the environment for detecting the one or more objects,
      receive one or more free space echo waves from the one or more objects, and
      generate the multiplexed echo signal using the free space echo waves and transmit the multiplexed echo signal to the central unit through the communication link.

16. The sensor network system of claim 15, the communication link is a bidirectional communication link.

17. The sensor network system of claim 15, wherein the one or more multiplexed probing signals comprise two or more optical probing signals and the one or more multiplexed echo signals comprise two or more optical echo signals.

18. The sensor network system of claim 15, wherein the free space probing waves are continuous waves (CW).

19. The sensor network system of claim 15, wherein the central unit comprises a signal processing unit, and wherein the signal processing unit comprises at least a digital signal processing unit.

20. The sensor network system of claim 15, wherein the central unit is configured to detect the one or more objects at least in part by one or more of:
   determining distances between the one or more transponders and the one or more objects;
   determining velocities of the one or more objects with respect to the one or more transponders;
   generating an object signal usable for determining the distances between the one or more transponders and the one or more objects; and
   generating an object signal usable for determining the velocities of the one or more objects with respect to the one or more transponders.

21. The sensor network system of claim 15, wherein the sensor network system is configured to detect the one or more objects using one or more sensing modalities, wherein different ones of the transponders are configured for same or different sensing modalities, and wherein the one or more sensing modalities include one or more of radar sensing, lidar sensing, imaging, kinematic sensing and position sensing.

22. The sensor network system of claim 21, wherein the one or more modalities include at least radar sensing.

23. The sensor network system of claim 15, wherein the central unit and the one or more transponders are physically separated by a distance of between a centimeter to one hundred kilometers.

24. The sensor network system of claim 17, wherein the two or more optical probing signals and the two or more optical echo signals comprise one or more optical carriers modulated with digital signals.

25. The sensor network system of claim 15, wherein the sensor network system is installed as part of an autonomous vehicle.

26. A centralized object detection sensor network system for detecting one or more objects in an environment, the sensor network system comprising a central unit communicatively coupled to one or more lidar-radar transponders through one or more communication links, wherein the one or more lidar-radar transponders are physically separate from the central unit while being communicatively coupled thereto through the one or more communication links, and wherein the central unit is configured to:
   generate one or more radar baseband signals,
   generate one or more radar probing signals using the one or more radar baseband signals,
   generate one or more lidar probing signals,
   transmit the one or more radar probing signals and the one or more lidar probing signals to the one or more lidar-radar transponders through the one or more communication links,
   receive one or more radar echo signals and one or more lidar echo signals from the one or more lidar-radar transponders through the one or more communication links, and
   detect the one or more objects based at least in part on the one or more radar echo signals, the one or more radar baseband signals, and the one or more lidar echo signals;
   wherein the one or more lidar-radar transponders are configured to:
      receive the one or more radar probing signals and the one or more lidar probing signals from the central unit through the one or more communication links,
      generate free space radar probing waves and free space lidar probing waves therefrom,
      direct the free space radar probing waves and free space lidar probing waves to the environment for detecting the one or more objects,
      receive one or more free space radar echo waves and one or more free space lidar echo waves from the one or more objects, generate the one or more radar echo signals using the one or more free space radar echo waves, generate the one or more lidar echo signals using the one or more free space lidar echo waves, and transmit the one or more radar echo signals and the one or more lidar echo signals to the central unit through the one or more communication links.

27. The sensor network system of claim 26, wherein each lidar-radar transponder of the one or more lidar-radar transponders comprises at least one lidar transponder configured to generate the free space lidar probing waves and at least one radar transponder configured to generate the free space radar probing waves, wherein the free space lidar probing waves comprise light waves and the free space radar probing waves comprise radio waves.

28. The sensor network system of claim 26, wherein the central unit comprises a radar central unit configured for detecting the one or more objects by radar sensing and a lidar central unit configured for detecting the one or more objects by lidar sensing.

29. The sensor network system of claim 28, wherein the radar central unit and the lidar central unit share one or more of a common signal processing unit, a common router, and common links between the central unit and the one or more lidar-radar transponders.

30. The sensor network system of claim 26, wherein the central unit detects the one or more objects at least in part by one or more of:

determining distances between the one or more lidar-radar transponders and the one or more objects;

determining velocities of the one or more objects with respect to the one or more lidar-radar transponders;

generating an object signal usable for determining the distances between the one or more lidar-radar transponders and the one or more objects; and generating an object signal usable for determining the velocities of the one or more objects with respect to the one or more lidar-radar transponders.

\* \* \* \* \*